US010647935B2

(12) United States Patent
Scalzo et al.

(10) Patent No.: US 10,647,935 B2
(45) Date of Patent: May 12, 2020

(54) PROCESS FOR BENEFICIATING AND CLEANING BIOMASS TO FORM ENGINEERED SOIL

(71) Applicant: ACTIVE ENERGY GROUP PLC, London (GB)

(72) Inventors: Philip J. Scalzo, South Jordan, UT (US); Carleton D. Tait, Bountiful, UT (US); Ronald A. Cella, Centerville, UT (US)

(73) Assignee: ACTIVE ENERGY GROUP PLC, London (GB)

( * ) Notice: Subject to any disclaimer, the term of this patent is extended or adjusted under 35 U.S.C. 154(b) by 0 days.

(21) Appl. No.: 15/983,479

(22) Filed: May 18, 2018

(65) Prior Publication Data

US 2018/0334630 A1 Nov. 22, 2018

Related U.S. Application Data

(63) Continuation of application No. 15/877,937, filed on Jan. 23, 2018.
(Continued)

(51) Int. Cl.
C10L 5/44 (2006.01)
C10L 5/36 (2006.01)
(Continued)

(52) U.S. Cl.
CPC ............... *C10L 5/442* (2013.01); *B01J 3/04* (2013.01); *C10L 5/363* (2013.01); *C10L 5/445* (2013.01);
(Continued)

(58) Field of Classification Search
CPC combination set(s) only.
See application file for complete search history.

(56) References Cited

U.S. PATENT DOCUMENTS 4,398,917 A 8/1983 Reilly
7,544,635 B2 6/2009 Liang et al.
(Continued)

FOREIGN PATENT DOCUMENTS

EP 1316620 6/2003
EP 2838981 2/2015
WO 2015/195440 A1 12/2015

OTHER PUBLICATIONS

"Peat-Free Product and Wood Fiber Production Process" by Promeco, available at least as early as Mar. 24, 2017.
(Continued)

*Primary Examiner* — Ellen M Mcavoy
*Assistant Examiner* — Chantel L Graham
(74) *Attorney, Agent, or Firm* — Durham Jones & Pinegar, P.C. Intellectual Property Law Group

(57) ABSTRACT

A process for cleaning and beneficiating biomass is described which may allow removal of entrained salts and light volatiles from biomass materials. The process may also minimize energy use through capturing steam and flue gases for re-use. The process may generally comprise the following steps: prewashing and/or preheating a biomass, pressurizing the biomass in a steam explosion vessel, rapidly depressurizing the steam explosion vessel, releasing the steam from the steam explosion vessel entrained with fine lignin-enriched particles into a cyclone-type gas expansion vessel, routing the steam from the gas expansion vessel to the input hopper, subjecting the biomass to a second washing step, mechanically removing a portion of the water from the biomass. After the biomass has been steam-exploded, it may be washed and used as an engineered soil.

24 Claims, 7 Drawing Sheets

Related U.S. Application Data

(60) Provisional application No. 62/508,043, filed on May 18, 2017.

(51) Int. Cl.
*B01J 3/04* (2006.01)
*C10L 9/08* (2006.01)
*B01J 8/00* (2006.01)

(52) U.S. Cl.
CPC .............. *C10L 9/08* (2013.01); *B01J 8/0065* (2013.01); *B01J 2208/0084* (2013.01); *B01J 2219/00162* (2013.01); *C10L 2290/02* (2013.01); *C10L 2290/06* (2013.01); *C10L 2290/08* (2013.01); *C10L 2290/30* (2013.01); *C10L 2290/46* (2013.01); *C10L 2290/48* (2013.01); *C10L 2290/50* (2013.01); *C10L 2290/52* (2013.01); *C10L 2290/545* (2013.01); *Y02E 50/10* (2013.01); *Y02E 50/30* (2013.01)

(56) References Cited

U.S. PATENT DOCUMENTS

| | | | |
|---|---|---|---|
| 9,422,481 | B2 | 8/2016 | Van Thorre et al. |
| 9,593,447 | B2 | 3/2017 | Scalzo et al. |
| 9,683,738 | B2 | 6/2017 | Catto et al. |
| 9,701,918 | B2 | 7/2017 | Tait et al. |
| 9,702,548 | B2 | 7/2017 | Scalzo et al. |
| 9,796,940 | B2 | 10/2017 | Tait et al. |
| 2002/0192774 | A1 | 12/2002 | Ahring et al. |
| 2005/0161038 | A1* | 7/2005 | Pinatti .................. B01J 19/0073 127/2 |
| 2008/0045762 | A1 | 2/2008 | Foody et al. |
| 2010/0037516 | A1* | 2/2010 | Hogsett .................. B01J 8/0065 44/626 |
| 2011/0100359 | A1* | 5/2011 | North ...................... C08H 8/00 127/1 |
| 2012/0000120 | A1* | 1/2012 | Stark ........................ B01J 3/04 44/605 |
| 2012/0028325 | A1* | 2/2012 | Herring ............... C08B 37/0003 435/165 |
| 2012/0041186 | A1* | 2/2012 | Pschorn ................... D21B 1/36 536/56 |
| 2015/0052805 | A1 | 2/2015 | Catto et al. |
| 2015/0052812 | A1 | 2/2015 | Scalzo et al. |
| 2015/0299579 | A1 | 10/2015 | Van Thorre et al. |
| 2015/0361367 | A1 | 12/2015 | Tait et al. |
| 2015/0361368 | A1 | 12/2015 | Tait et al. |
| 2015/0361369 | A1 | 12/2015 | Tait et al. |
| 2015/0362179 | A1 | 12/2015 | Catto et al. |
| 2015/0362180 | A1 | 12/2015 | Scalzo et al. |
| 2015/0362184 | A1 | 12/2015 | Tait et al. |
| 2015/0362185 | A1 | 12/2015 | Van Thorre et al. |
| 2015/0376530 | A1* | 12/2015 | Brusletto ................ F23G 5/027 110/347 |
| 2016/0010015 | A1 | 1/2016 | Van Thorre et al. |
| 2016/0010016 | A1* | 1/2016 | Catto ...................... C10L 5/363 44/590 |
| 2016/0010017 | A1 | 1/2016 | Scalzo et al. |
| 2016/0097157 | A1 | 4/2016 | Scalzo et al. |
| 2016/0298047 | A1 | 10/2016 | Lawrence et al. |
| 2016/0326444 | A1 | 11/2016 | Van Thorre et al. |
| 2017/0121620 | A1 | 5/2017 | Tait et al. |
| 2017/0145331 | A1 | 5/2017 | Scalzo et al. |

OTHER PUBLICATIONS

Ceglie FG, Bustamante MA, Ben Amara M, Tittarelli F (2015) The Challenge of Peat Substitution in Organic Seedling Production: Optimization of Growing Media Formulation through Mixture Design and Response Surface Analysis. PLoS One 10(6) e0128600. doi:10.1371/journal.pone.0128600.
Ramos, Luiz P. "The chemistry involved in the steam treatment of lignocellulosic materials", Quimica Nova, 2003.
Shu, H. et al., "Agricultural Waste", Water Environment Research, vol. 87, No. 10, 2015, 1256-1285.
Van Wyk, Jacobus , "Biotechnology and the utilization of biowaste as a resource for bioproduct", Trends in Biotechnology , vol. 19 , Issue 5, 172-177.
International Preliminary Report on Patentability from WO2015195440 dated Dec. 20, 2016.
European Search Report, Aug. 6, 2018 in related European Application No. EP 18171014.6.
International Search Report and Written Opinion of the International Searching Authority from PCT/IB2018/053501, dated Jun. 8, 2018.
European Patent Office as International Searching Authority, "International Preliminary Report on Patentability", for application No. PCT/IB2018/053501, dated Nov. 19, 2019.

\* cited by examiner

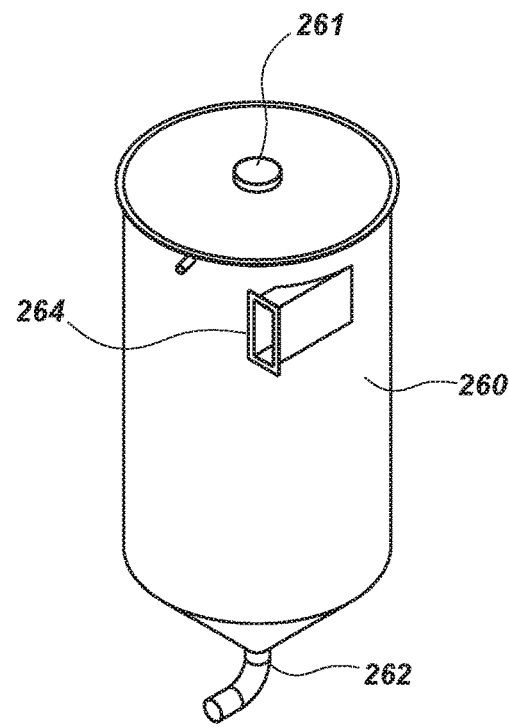
FIG. 6
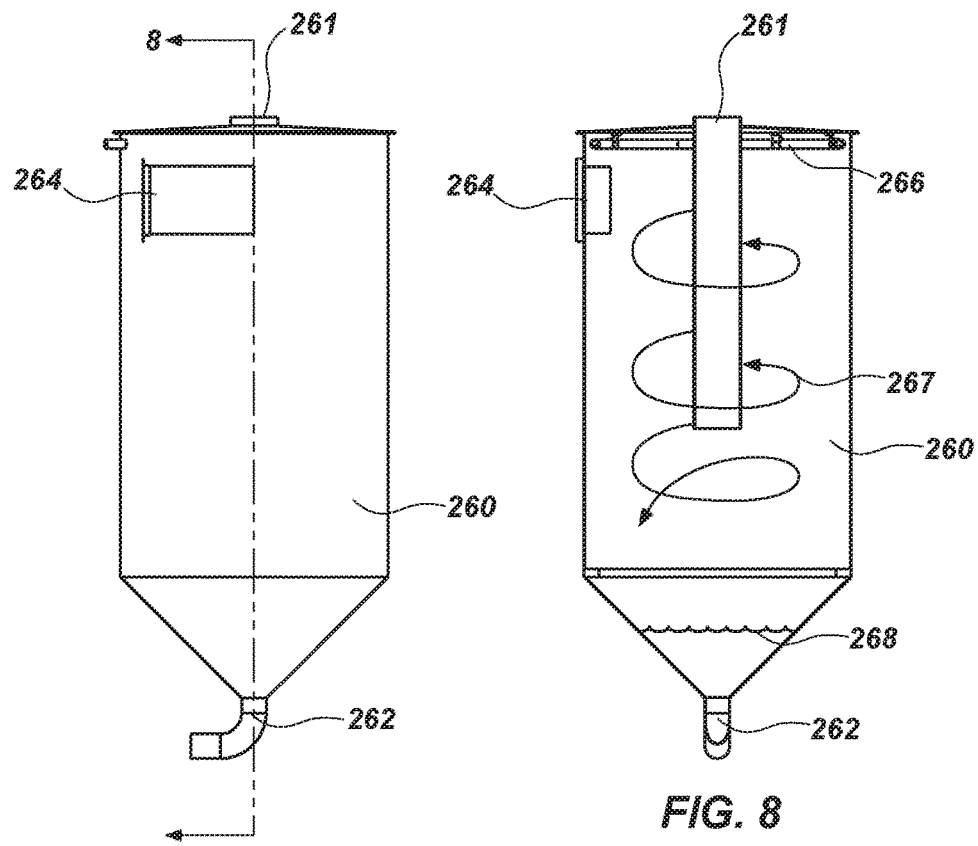
FIG. 7
FIG. 8

PROCESS FOR BENEFICIATING AND CLEANING BIOMASS TO FORM ENGINEERED SOIL

TECHNICAL FIELD

This disclosure relates generally to the field of physical and chemical processes for converting biomass into an end product suitable for use as an engineered soil. More particularly, the disclosure relates to processes for converting biomass into a soil which may be built with a modular design and modified to fit particular field requirements.

BACKGROUND

Biomass encompasses a wide array of organic materials including wood, woody waste, agricultural residues, and crops grown specifically for energy production. The U.S. alone generates billions of tons of biomass annually. Beneficiated biomass, in which the moisture content has been reduced and the energy density has been increased, can be used as a feedstock for several products, including pellets for residential heaters, hydrocarbon liquid fuels, cellulosic ethanol, solid fuel to supplant coal, or for production of synthetic natural gas.

Beneficiation is the treatment of raw material to improve physical or chemical properties and typically includes steps to increase the energy density. Conventional methods to beneficiate biomass include heat/steam treatment, torrefication, and pressure extrusion ("densification"). These methods have not been designed necessarily to remove entrained salts.

As an alternative, a re-designed heat/steam treatment of biomass materials with additional cleaning steps can substantially improve the quality of densified biomass while also reducing the amount of required energy. Heat/steam treatment has a variety of descriptions and methods in the literature and centers on biomass drying and energy densification. Most heat/steam systems dry the material early in the process, even before the heat/steam process.

Steam-exploded beneficiated biomass, in which the plant fibers are disrupted and the sugars associated with cellulose and hemicellulose are made more available to plant-supporting micro-organisms, can be used as an engineered soil, or soil supplement. As an alternative to peat, steam exploded biomass materials can substantially improve the quality of biomass for engineered soil producing a loosely packed, peat-like material. The beneficiated biomass resembles peat in its composition and usefulness, thereby preserving endangered peat bogs, which can take centuries to recover from harvesting. The process of the present invention produces a material very similar in composition to peat moss.

Thus, there is a need for beneficiation methods to further remove entrained salts and light volatiles from biomass materials. It may also be desirable to minimize energy use through capturing steam and flue gases for re-use. It also may be desirable to use treated biomass materials as an engineered soil.

SUMMARY

The chemical and steam-explosion processes described herein produces an engineered soil.

According to another aspect of the present disclosure, the processes described herein may allow otherwise waste biomass, such as non-heart wood scraps or salt-laden wood, to be used as a biomass input rather than rot in compost piles, thereby preventing release of the potent greenhouse gas methane into the atmosphere.

According to another aspect, a process is described comprising one or more of the following steps: prewashing and/or preheating a biomass, pressurizing the biomass in a steam explosion vessel or reaction vessel, rapidly depressurizing the reaction vessel (either all at once, or step-wise by a first release, a period of time, and then a second release), releasing the steam from the reaction vessel entrained with fine, lignin-enriched particles into a cyclone-type gas expansion vessel, routing the steam from the gas expansion vessel to an input hopper, subjecting the biomass to a second washing step, mechanically removing a portion of the water from the biomass.

According to another aspect, the steam explosion vessel or reaction vessel comprises an inner perforated screen separating the biomass from the main body of the steam explosion vessel and with one or more perforated screen fingers disposed within the steam explosion vessel and positioned within the biomass to increase exposure of the biomass to steam.

According to still another aspect, the steam explosion vessel may have a vertical orientation. In some configurations, the steam explosion vessel may be provided with o-ports, gate valves, and/or autoclaves to seal the top and bottom of the steam explosion vessel. The steam explosion vessel may include a perforated screen liner with one or more screen in/down-comers. The steam explosion vessel may also be provided with a rapidly opening valve such as a fast-opening offset butterfly valve.

According to another aspect, the step of rapidly depressurizing the steam explosion vessel disrupts the biomass structure and releases biomass salts and light volatile organic compounds entrained within the biomass and produces steam containing at least partially lignin-enriched fine particles. The cyclone-type gas expansion and gas-release vessel may be configured to capture the entrained fine lignin-enriched particles.

According to still another aspect, various steps are described to reduce the energy required to complete the process. For example, the step of routing the steam from the gas expansion vessel to the input hopper may recapture heat from the captured steam and steam condensate to heat and wet the biomass in the input hopper. Insulation of the steam explosion vessel and other components may save energy, as well as routing of steam and use of heat from flue gas to improve energy balance of plant.

According to yet another aspect, the disrupted biomass may be subjected to a second washing step to remove additional salts and light volatile organic compounds derived from the disrupted biomass. This second washing step may be done in a separate wash tank or washing apparatus. In some configurations, the entrained fine lignin-enriched particles captured in the gas expansion vessel may be added to the biomass in the second washing step. In other configurations, they may be added at a later step or not added and used for a separate purpose.

According to another aspect, mechanically removing a portion of water from the biomass may be accomplished with extrusion water removal steps, wherein the resulting biomass comprises less than about 50% water by weight and wherein additional salts and light organic compounds derived from the disrupted biomass are removed with the water.

In some configurations, mechanically removing a portion of water from the biomass may be accomplished through use of one or more of a screw press, roller press, torque/grinder presses, etc.

BRIEF DESCRIPTION OF THE DRAWINGS

Various embodiments and aspects of the present disclosure are shown and described in reference to the numbered drawings wherein:

FIG. 6 shows a perspective view of an exemplary gas expansion vessel;

FIG. 7 shows a side view of the gas expansion vessel of FIG. 6;

FIG. 8 shows a cross-section view of the expansion vessel of FIGS. 6 and 7, taken along line 8-8 of FIG. 7;

Figure 1:
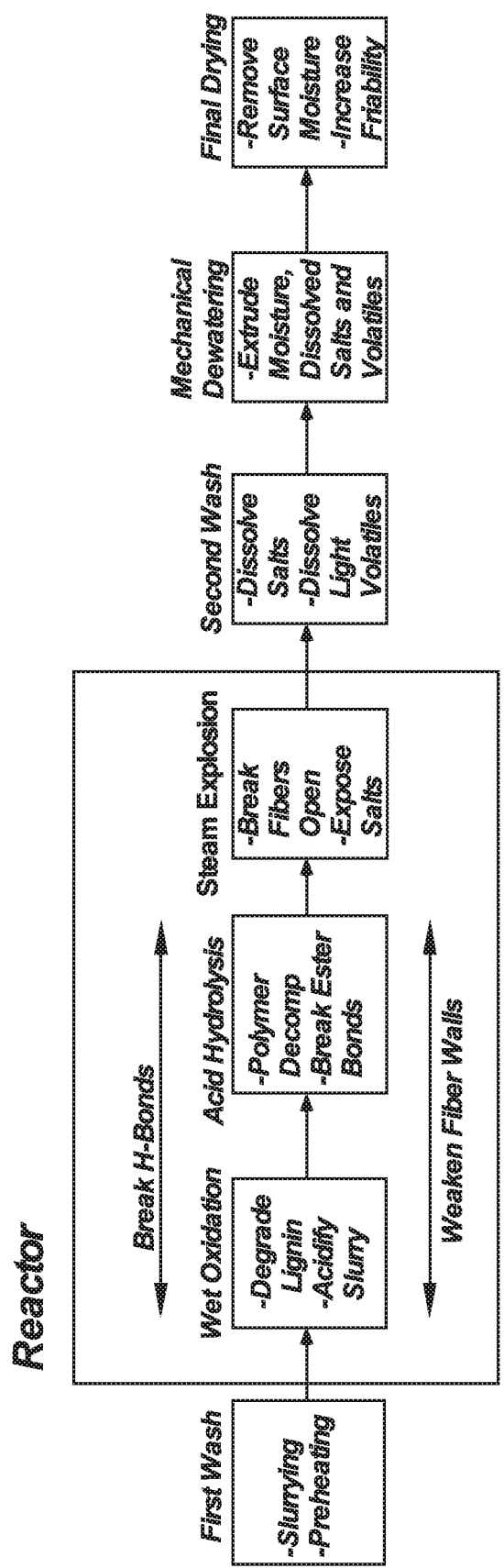
FIG. 1 shows a flow diagram of chemical and physical steps and features involved in the beneficiation/wash process described in the present disclosure.

It will be appreciated that the drawings are illustrative and not limiting of the scope of the invention which is defined by the appended claims. The embodiments shown accomplish various aspects and objects of the invention. It will be appreciated that it is not possible to clearly show each element and aspect of the present disclosure in a single figure, and as such, multiple figures are presented to separately illustrate the various details of different aspects of the invention in greater clarity. Similarly, not all configurations or embodiments described herein or covered by the appended claims will include all of the aspects of the present disclosure as discussed above.

DETAILED DESCRIPTION

Various aspects of the invention and accompanying drawings will now be discussed in reference to the numerals provided therein so as to enable one skilled in the art to practice the present invention. The skilled artisan will understand, however, that the methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one embodiment," "one configuration," "an embodiment," or "a configuration" means that a particular feature, structure, or characteristic described in connection with the embodiment may be included in at least one embodiment, etc. The appearances of the phrase "in one embodiment" in various places may not necessarily limit the inclusion of a particular element of the invention to a single embodiment, rather the element may be included in other or all embodiments discussed herein.

Furthermore, the described features, structures, or characteristics of embodiments of the present disclosure may be combined in any suitable manner in one or more embodiments. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinary skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

It should also be noted that, as used in this specification and the appended claims, singular forms such as "a," "an," and "the" may include the plural unless the context clearly dictates otherwise. Thus, for example, reference to "the vibratory screen separator" may include reference to one or more of such vibratory screen separators.

As used herein, the term "generally" refers to something that has characteristics of a quality without being exactly that quality. For example, a structure said to be generally vertical would be at least as vertical as horizontal, i.e. would extend 45 degrees or greater from horizontal. Likewise, something said to be generally circular may be rounded like an oval but need not have a consistent diameter in every direction.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Turning now to FIG. 1, diagram of the chemical and physical processes that underlie this teaching are shown. The process described herein disrupts the cross-linking barriers in biomass fibers to defeat fresh biomass recalcitrance to produce an engineered soil. With the combined benefits produced through this teaching, biomass inputs may include slash, salt-laden hogged woodpiles, and waste piles, any of which can be used as fuel for boilers without pre-ignition, slagging, fouling, or corrosion.

Biomass consists primarily of cellulose, hemicellulose, and lignin located in the secondary cell wall of relevant plant materials. Pretreating and in-process treating of the wet biomass with pressurized steam produces several chemical reactions, explicitly described here. Wet oxidation is initiated, which starts the degradation of the lignin as well as produces some acid in the slurry as small side groups are cleaved from the hemicellulose to form small organic acids (for example, small side groups ranging from small acetyl groups to acetic acid). Acid is also produced in the oxygen-promoted depolymerization of cellulose and hemicellulose chains. Subsequent acid hydrolysis from the produced acid breaks ester bonds and continues polymer decomposition. No acid need be added externally to the process: the acid may be produced in situ and used for subsequent breakdown of polymers, especially the ester linkages between lignin polymers and lignin-cellulose polymeric cross-linkages.

Throughout this process, hydrogen bond disruption occurs through which hydrogen bonds interconnecting polymer fibers of cellulose and hemicellulose are also broken due to increased vibrational energy and the lowering of the dielectric constant in hot water. Once the fiber walls have been weakened after a certain residence time in the steam explosion vessel or reaction vessel, the pressure is rapidly released. With the rapid release of external pressure, the internal pressure within the cell must also be released, resulting in the bursting of the weakened cell wall. The steam explosion step breaks open the fibers to expose salts and light volatiles formed primarily from degradation of the hemicellulose for subsequent dissolution and extrusion. During steam explosion, the lignin also is affected. The ether linkages of high molecular weight lignin break to generate lower molecular weight lignin. Furthermore, it melts, redistributes, condenses, and forms beads on the surface of the cellulose micro-fibrils and thus increases the porosity of the microfibers.

Figure 2:
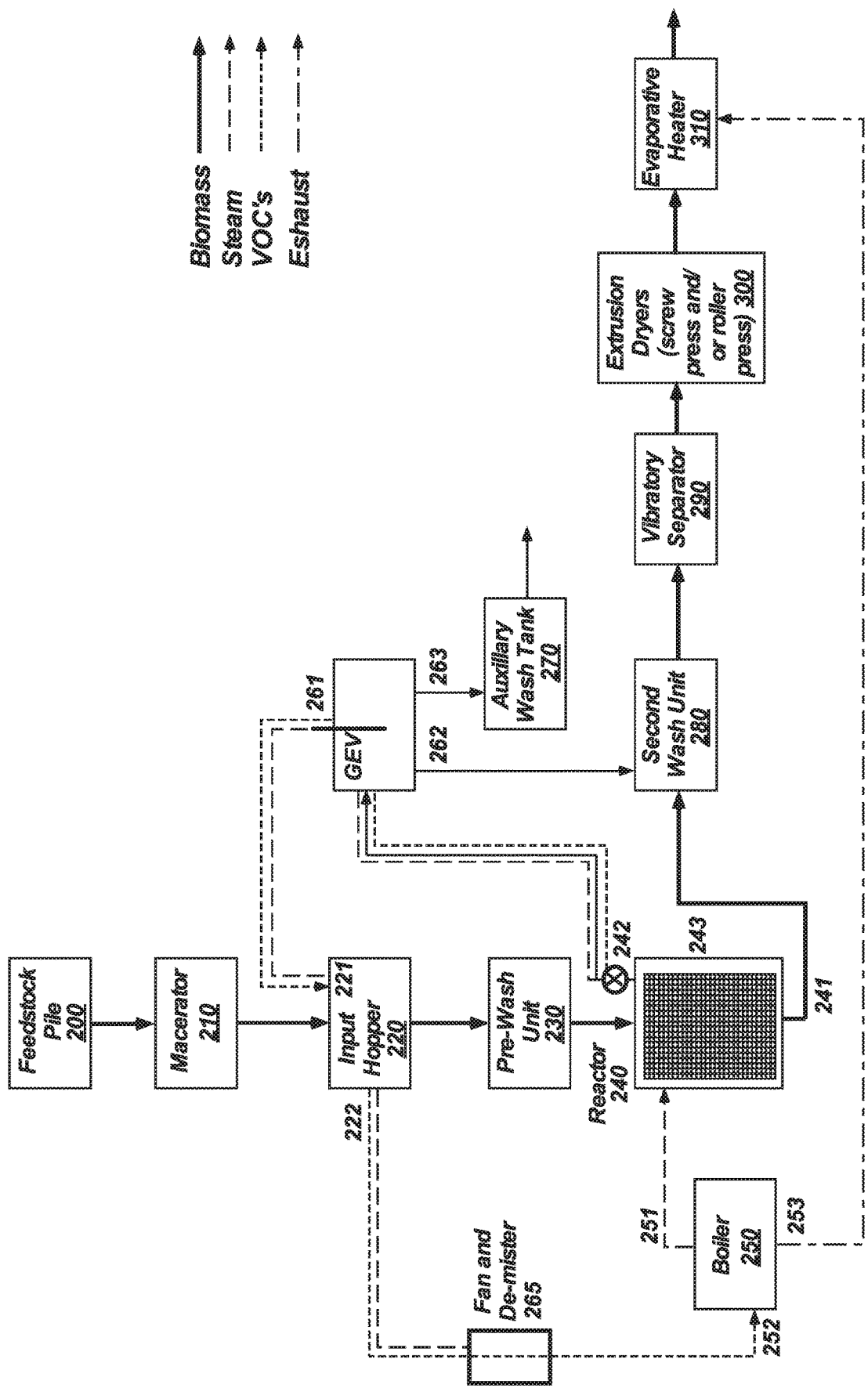
FIG. 2 shows a schematic of system components used in the beneficiation/wash process.

FIG. 2 shows a schematic of the equipment to process the biomass according to the steps described herein. The process may initially employ a macerating operation (210) to appropriately size and expose surface area from, for example, woody wastes or other dense materials. Generally, macerated materials enter the process at input hopper 220 in pieces of about one-half to quarter inch and smaller size. The macerating steps may macerate the biomass into various sizes depending on the desired results, for example, the biomass may be macerated into pieces of about 3.81 centimeters (1.5 inches) to about 0.635 centimeters (0.25 inches). Conveyor belts may take the macerated biomass from the input hopper to the pre-wash processing unit 230.

The macerated biomass input is introduced to a pre-wash processing unit or container 230. Besides wetting the material for subsequent steam explosion, this step can be used to remove unwanted external ash, dirt, and initiate a start at removing the salts. A short sluice between the input hopper and pre-wash unit removes the heavy rocks, pebbles, sand, etc. while allowing the lighter, floating biomass to be flowed into the pre-wash unit. The rocks, sand, etc. sink to the bottom trap, which can be opened periodically to remove them. A magnetic trap may be added (either at the macerator/hopper 220, the pre-wash container/processing unit 230, or at another point in the cycle) for removing any remaining iron scrap from the harvesting process such as bolts or nails.

Beginning at the input hopper 220 and/or the pre-wash unit 230 and extending through the drying steps, insulation of the external surfaces of the parts of the system may improve energy balance. Preservation of heat from one batch of biomass to the next may build a steady state temperature approaching water's boiling point and recycle what otherwise would have been lost energy. As described below, steam from the steam-explosion step may be directed to the input hopper 220, adding heat and starting the chemical processes that weaken the cell walls. Re-use of steam rather than just direct release to the environment conserves heat and improves the energy balance.

The pre-wash unit 230 may be an agitated/stirred vat or a dynamic trommel system, wherein water is contacted to the biomass conveyed via an auger up to the holding tank for the steam explosion vessel, or reactor, 240. The trommel may comprise, for example, an inclined screw/auger surrounded by a screen in a partially-filled water tank. The biomass may be wetted as it moves upward along the screw/auger while dirt is mechanically separated and falls through the screen to a removal container. The auger/water slurry may be surrounded by a screen through which the water and entrained dirt and salt can exit. In the trommel arrangement, an auger may be welded into a screen (for example, a screen with one-quarter inch holes) through which the water, dissolved salts, and any remaining entrained dirt can exit with the dirt falling to the bottom of the tank. The auger/screen unit may be semi-submerged in the water bath and inclined at about a 10 degree angle. The motion of the auger moves the in-coming biomass up through the trommel. Paddles placed periodically along the auger help move the biomass into and out of the water bath as it moves up and through the prewash unit, thereby agitating and washing the biomass. Nozzles above the trommel spray water on the biomass and clean it further. The biomass emerges from the auger and falls into a holding tank for the reactor. To remove contaminated water from the tank, a fraction may be pumped out to the water treatment plant, and replaced with an equal amount of fresh water.

At the pre-wash unit 230, chemicals suitable for permeating and disrupting biomass fibers and promoting wet oxidation and/or acid hydrolysis to disrupt hemicellulose and lignin cross-linking, and solubilize other contaminants, may also be added. The input biomass material could be mixed with appropriate chemicals to permeate the plant fibers and accelerate the chemical processes, including hydrogen-bond breaking, wet oxidation, and acid hydrolysis reactions to disrupt the hemicellulose and lignin cross-linking barriers. Additional chemical applications, depending on the physical properties of the biomass input, may comprise aqueous solutions of methanol, ammonium carbonate or carbonic acid. Other potential chemical applications include ammonia (leads to AFEX (Ammonia Fiber Explosion) process), acetone, acetonitrile, and different combinations of them. In addition, the use of solvents such as methanol may be desirable for biomass input having preservatives or a soft wood content to dissolve creosote or resins contained in the woody biomass to allow the beneficiation chemicals better contact with the fibers. For example, a 50:50 water:methanol mix by volume is effective at dissolving glue components (e.g. formaldehyde) used in plywood/demolition wood. Because of the higher volatility of methanol, the reactor must be designed for higher pressures to achieve the same temperature and effectiveness as pure water; pressures to 650 psi may be required and must be pre-engineered in specially made systems for these higher pressures for safety.

Figure 3:
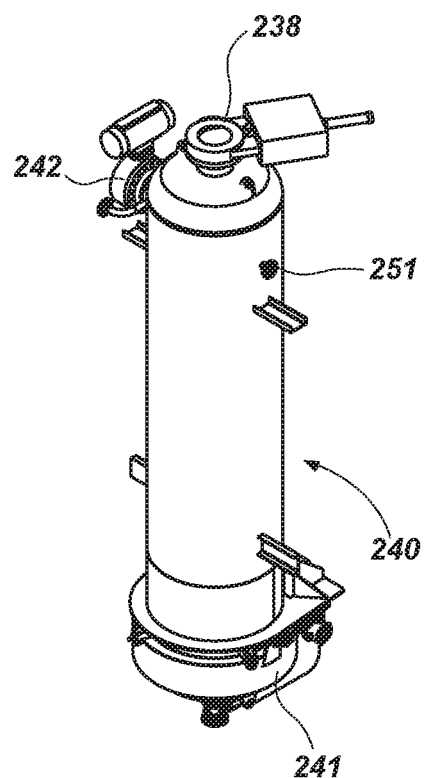
FIG. 3 shows a perspective view of an exemplary steam explosion vessel or reaction vessel.
Figure 4:
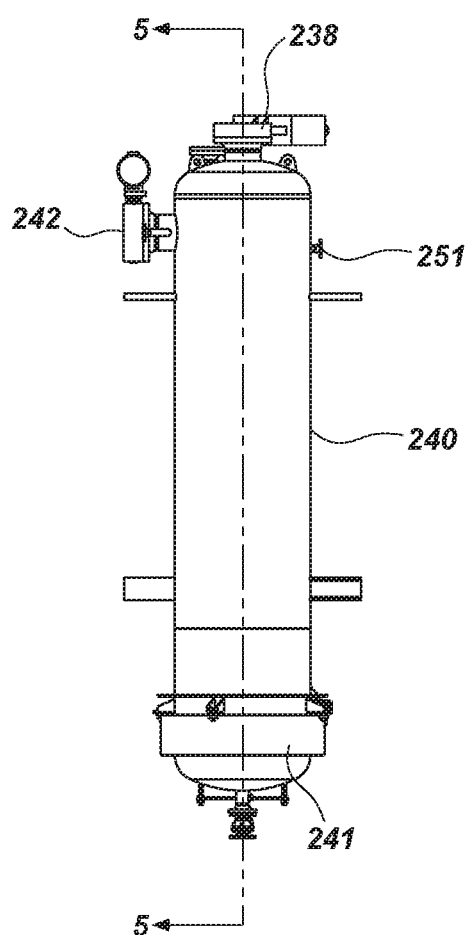
FIG. 4 shows a side view of the reaction vessel of FIG. 3.
Figure 5:
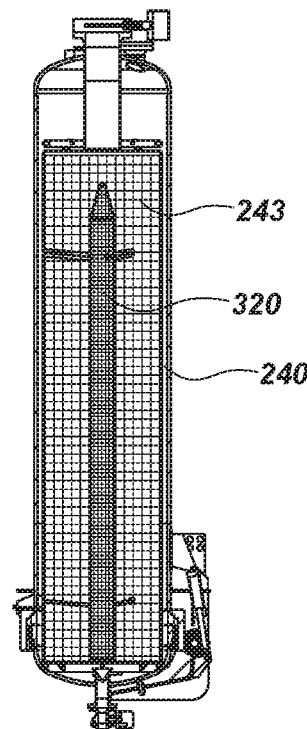
FIG. 5 shows a cross-sectional view of the reaction vessel of FIGS. 3 and 4, taken along line 5-5 of FIG. 4.

After the pre-wash unit 230, the biomass is mechanically passed into a vertically oriented steam explosion vessel or reaction vessel 240 for chemical conditioning on the cell walls followed by steam-explosion. FIG. 3 shows a perspective view of the reaction vessel 240, FIG. 4 shows a side view, and FIG. 5 shows a cross-sectional view of the reaction vessel taken along line 5-5 of FIG. 4. A valve 238 may allow for selectively opening and closing of the passageway from the pre-wash processing unit 230 to the steam explosion vessel 240. A steam input 251 may be disposed on the reaction vessel 240, connecting the reaction vessel to a boiler 250 or other source of steam (e.g., steam generator/thermal fluid heater combination). The vertical arrangement or generally vertical arrangement, with the input gate/valve 238 at top and output gate (such as an autoclave door) 241 on the bottom, may provide benefits over a horizontal orientation, including: ease of loading with mechanical or pneumatic conveyors; taking advantage of gravity for loading and unloading; size of biomass chips less critical compared to horizontal loading with potentially less grinding required at front end; and footprint of plant reduced. A horizontal-oriented reaction vessel module may also be used, but in some applications may be less effective.

All the surfaces exposed to the reaction in the reaction vessel 240 and subsequent wet biomass in the process may be formed from stainless steel. While other materials may be possible, in the present configurations no treatments or coatings that would allow for the use of less expensive carbon steel were found to be effective in the hot, wet reaction conditions with rapid expansion/contraction phases corresponding to high and low pressure conditions in the reaction vessel. The doors on either end of the reaction vessel 240 may be comprised of autoclave doors, o-port valves, knife valves, etc.

The reaction vessel 240 may comprise an inner perforated screen 243. The perforated plate/screen 243 may be formed from any suitable material, for example, stainless steel, and may be suspended within the reaction vessel with sufficient space between the screen 243 and reaction vessel wall, allowing the steam direct access to a much greater cross section of biomass. For example, the screen may separate the biomass from the wall of the reaction vessel by about 1.27 centimeters (0.5 inch) to about 5.08 centimeters (2 inches). In this manner, the perforated screen 243 may separate the biomass from the main body of the reaction vessel 240. The size of the holes in the screen 243 can be chosen based on the size of the biomass chips about may typically be about 0.3175 centimeters (one-eighth inch) to about 0.635 centimeters (one-quarter inch). The range could be expanded for smaller materials, such as sawdust and larger materials such as empty fruit bunches.

The screen 243 may also be provided with one or more perforated screen fingers 320 (see FIG. 5) disposed within the reaction vessel 240 and positioned within the biomass to increase exposure of the biomass to steam. The perforated screen fingers 320 may be positioned away from the wall of the reaction vessel 240 to maximize exposure of the biomass to the steam. Perforated screen fingers may be downcomers (open to steam from the top of the reaction vessel) and/or upcomers (open to steam from the bottom of the reaction vessel, as in the upcomer 320 shown in FIG. 4). For example, perforated screen downcomers (stalactite configuration) or upcomer(s) (stalagmite configuration) may be suspended/extended from the top/bottom. The pattern and number of fingers may be configured such that the maximum distance of any biomass to steam headspace is around 9 inches to increase steam penetration.

The use of the perforated screen 243 and/or screen finger(s) 320 may allow steam to surround the biomass, and may allow a large volume of biomass that would otherwise insulate from the steam, to be exposed to the steam, resulting in more fiber disruption. Without a perforated screen 243, a large volume of biomass may otherwise insulate the material from the steam, resulting in significantly less fiber disruption. The addition of fingers to shorten the maximum distance between a steam channel and the most deeply buried biomass may allow both better steam entrance/exposure to biomass material and better/quicker steam exit and hence better steam-explosion. These plurality of perforated finger screen liners may have a plurality of screen hole sizes.

After closing the reaction vessel 240, pressurized saturated steam is introduced into the reaction vessel from a boiler or steam generator 250. The exact reaction conditions (pressure, temperature, residence time) depend on the nature of the biomass input. Specific examples are given below in Table I. Typical conditions for woody biomass might be 400 to 450 psi, 448° F. for 15 to 20 minutes. Herbaceous materials may require less severe conditions (350 to 420 psi for 15 to 20 minutes). The temperature of the saturated steam is directly related to the pressure through the well-known Steam Tables.

Chemical effects such as hydrogen bond breaking, wet oxidation, and acid hydrolysis of the cellulose, hemicellulose, and lignin, occur during the retention time, weakening the cell wall in preparation for the rapid depressurization.

The profile of the applied chemical treatments may be tailored for particular biomass inputs. The reaction vessel's temperature, pressure, biomass residence time, and chemical concentrations are carefully controlled so as to optimize process conditions for a particular biomass input. Table I lists varying conditions for exemplary biomass inputs. (Table I is given by way of example, not of limitation. Other types of biomass inputs not typically used, such as railway ties, may require different conditions, such as different solvents like methanol, 50:50 methanol:water, pressures beyond 600 psi in the reaction vessel, and/or extra time in the reaction vessel.) Sensors may be strategically positioned within the reaction vessel 240 to provide real-time feedback to the control system to ensure optimization. The details of the applied chemical treatments versus particular biomass inputs and conditions may be captured in a library of algorithms and programmed to be applied.

After a predetermined residence time dictated by the characteristic biomass input, the pressure is released rapidly in the reaction chamber 240, for example by rapidly opening a valve 242. The rapid pressure release may produce a stream of outrushing steam. The perforated screen 243, which had allowed a better ingress of the steam to the biomass, now may give a larger cross section for rapid release and egress. The diameter of the rapidly opening pressure release valve 242 is the rate determining step for pressure release, not resistance from steam trying to find its way through the biomass. Larger valves allow for quicker depressurization, and different types of pressure release valves allow for different outcomes. Because of the large pressures (force per square inch) and surface areas involved, many types of valves, such as ball valves, may produce huge frictional forces that oppose fast opening. To avoid this problem, an offset butterfly valve may be used, in which an opening counter-force from the smaller side of the butterfly partially offsets the closing force on the other side of the valve. This force-balancing makes opening the valve in less than 500 microseconds practical with an off-the-shelf offset butterfly valve with a stepping motor. The minimized torque may allow for controlled but still fast opening. Alternatively, in another configuration, several smaller valves could be ganged together to open simultaneously. The combined cross section of the smaller valves may add up to the single cross section of the larger valve, but with the down side of additional vessel penetrations and may require a synchronization scheme.

Sudden decompression of steam and any entrained volatile compounds entrained within the lignocellulose fibers causes cells walls to explode and shatter from the inside out. Other physical changes in the biomass, such as de-crystallization of cellulose and hemicellulose may occur simultaneously with the shattering of cell walls. The resulting biomass particles exhibit an increase in the size and number of micropores in their fibers, and resultantly, increased surface area. With respect to forming an engineered soil, the enhanced surface area and disrupted cellulose (polymer of glucose sugar monomers) of the biomass may render it more readily available for any subsequent digestion by beneficial micro-organisms in the soil environment. After the initial out-rush of steam, further steam may be produced from moisture due to the high temperature of the reactor system, and this slower out-rush can continue for 30 to 60 seconds, cooling the reactor to about 100° C. (212° F.) in the process. At that point, the autoclave discharge door may be opened. The steam-exploded biomass may fall to a conveyor to be transferred to the desired next step, such as a post was agitation tank, etc.

There is a large burst of steam pressure during the rapid opening of the valve 242, followed by further steam flow for another 30 to 45 seconds as water from the wet biomass evaporates and leaves the reactor. This may cool the reactor and the inner screen, which cools to about the atmospheric boiling point of 100 degrees Celsius (212 degrees Fahrenheit). This allows subsequent loading of the next biomass batch to occur without large steam loss and difficulties associated with a hot surface and wet biomass. A considerable amount of this heat energy is kept in the system by directing the steam to the input hopper 220. Volatile organic compounds (VOCs) derived from the steam explosion step may be routed from the steam explosion vessel through the input hopper and directed to a boiler flame to incinerate the VOCs to eliminate emissions of light volatile organic compounds and simultaneously generate heat for the steam explosion step. The steam from the reaction vessel or steam explosion vessel may be fed into the input hopper 220, where some of it condenses and heats the biomass to 100 to 120 degrees F. (40 to 50 degrees C.).

The steam and the entrained volatile chemicals within the fibers are released quickly, breaking open the cell from the inside as the interior pressure is released in response to the release of the exterior pressure. Physical effects such as de-crystallization of cellulose and hemicellulose occurs in parallel with the breaking of the cell wall. The resulting biomass particles exhibit an increase in the size and number of micropores in their fibers, and resultantly, an increased surface area. The enhanced surface area and disrupted cellulose (polymer of glucose sugar monomers) of the biomass exposes the entrained/entrapped salts to subsequent washing (as detailed below).

The pressure release step described above may result in a thunderous, almost explosive release of steam. The nearly instantaneous release of pressure initially releases superheated steam present in the head of the reactor. Once the internal pressure of the reactor drops, superheated liquid water within the reactor flashes to steam and escapes through the rapid depressurization valve 242. As the initial release of the superheated steam drastically lowers both the amount of energy stored in the reaction vessel 240 and the internal pressure. It is this initial pressure drop that causes the biomass within the reactor to explode. Thus, it has been determined that by "burping" the reactor once or twice for periods of about one second each may decreases the noise level of the steam release step, and/or allow greater control of the process. Specifically, the rapid depressurization valve 242 is first opened for 1 second, and then immediately closed. After a period of 30 to 60 seconds, it may be again opened for a one-second interval. In one example, it was observed that the first burp reduces the pressure from about 430 psi to about 109 psi. Although it was assumed that the pressure within the reactor 407 would rebound during the 30 to 60 second period between burps, it remained around 109 psi, and dropped to 40 psi immediately following the second burp.

In one configuration shown in FIG. 12, the reaction vessel 240 comprises at least two steam outlets, such as a first steam outlet 295 in connection with a rapid depressurization valve, the first outlet having a diameter of about at least 25 centimeters (12" may be used, for example). A second steam outlet 296 may comprise a smaller outlet pipe with a diameter of about at least 4 centimeters (2" may be used, for example). The second steam outlet may connection with a depressurization valve 297, such as a simple ball valve.

After one or two openings of the rapid depressurization valve, the remainder of the pressure within the reaction vessel 240 may then be released to the GEV through the second steam outlet 296 provided with a valve 297, such as a simple ball valve, over the course of a few minutes. As a result of this modified pressure-release step, less pressure may be built up in the GEV overall, and less particle loss to the GEV is noted due to the lowered strength of the stream of steam. The material that is recovered from the reactor is just as good as the material had been when all the energy was released through the first, larger outlet 295 to the GEV 260.

The energy released through the smaller outlet pipe 296 may be recovered by taking a number of steps, either singly or in combination. The energy can be vented to the next reactor to be charged. This would work until the pressure in the two reactors equalized, at which point the first (pressure release) reactor is isolated from the second (pressurizing) vessel with one or more valves. The remaining pressure can then be dissipated in one or more of the following ways: (1) vent the energy to the input hopper via the GEV 260. Since the smaller outlet 296 pipe having a diameter of about 4-6 centimeters is used, this may be less problematic than venting the energy through the larger outlet pipe. (2) Vent the energy to an electric generator turbine through the smaller outlet pipe 296 and reclaim the energy as electricity, with or without the GEV 260. The smaller outlet pipe 296 may have less flow so the steam output is steadier than the burst through the larger outlet pipe 295. It may also be more manageable with respect to the size of the generator needed. (3) Vent the energy through the smaller outlet pipe 296 and GEV 260 into the atmosphere.

A problem associated with steam explosion as a pretreatment for fermentation processes designed to produce ethanol or methanol for fuel is the formation of compounds, such as furfural, that inhibit the work of certain microorganisms involved in the fermentation process. To lessen that effect in engineered soil, and to wash out some of the other products of the steam explosion (sugars, tannins, salts, small organic acids such as acetic acid), the steam exploded biomass may be rinsed and agitated with water in a post wash agitation tank. Excess water may then be removed from the washed material with a press, a colander, or other strainer device.

The washed biomass material, may have a pH of about 4 and a moisture content of between 50 to 75 percent. As such, it can be used as is as a peat replacement or sent to a mixing and addition station, where other ingredients are added, resulting in a final product. Possible additions include neutralization with lime or calcium carbonate, or other materials like urea for nitrogen content, or potash for potassium content. Likewise, if the recovered fine particles from the GEV (described in detail below) are kept separate, they can be used either without further treatment or sent to their own mixing and addition station.

Turning back to the overall process detailed in FIG. 2, the biomass from the reaction vessel 240 may pass to a second wash unit 280, while the steam (which contains fine particles of beneficiated biomass are entrained therein) may pass to a cyclone-type gas expansion vessel (GEV) 260 to control the outrush of steam and capture the entrained biomass. The GEV 260 is a large-volume cyclone in which the outrushing steam is introduced tangentially. FIG. 6 shows a perspective view of the GEV 260, FIG. 7 shows a side view, and FIG. 8 shows a cross-sectional view taken along line 8-8 of FIG. 7. A downcomer pipe, or down tube 261, may extend from the top of the GEV 260 to a position below which the fines, and condensed steam from the reaction vessel is introduced. Some volatile organic compounds (VOCs) produced in the reaction vessel 240 may also be entrained in the out-rushing steam. The down tube 261 may release steam and VOCs from the GEV 260. The steam may be directed from the downcomer pipe 261 to the input hopper 220 to conserve BTUs and convey some moisture and heat to the input biomass. The input hopper 220 is not sealed, so pressure does not build up at the input hopper 220. Instead, a fan sucks excess steam pressure and entrained VOCs into the fan and de-mister section 265, wherein the steam is condensed and may be removed from the gas flow, blowing the VOCs to the air input 252 of the boiler 250 for incineration.

The GEV 260 may serve the purpose of separating the entrained fine, lignin-enriched particulates from the steam and VOCs, and these fine particulates may drop below the down tube input and be collected. The GEV 260 may include an input 264 for the steam, VOCs, and fines from the reaction vessel 240, a water input, a gas escape through the downcomer pipe 261 (which may lead to the input hopper 220), and an array of nozzles 266 for cleaning water and for pre-loading the bottom of the GEV 260 with water. The water may be pre-loaded before the explosion step and thus pre-positioned in the bottom of GEV to catch fines. Also shown are arrows 267 indicating the cyclone in the GEV. A slurry of fines and water 268 may collect at the bottom of GEV 260, and the slurry of fines and water 268 can exit the base of the GEV 260 through valve/exit 262.

As the steam enters the GEV through input 264, the energy of the resulting vortex is scrubbed through expansion and friction. Biomass particles drop out to the bottom of the GEV where they can be collected through valve 262, and the steam escapes through the downcomer pipe 261 to avoid pressure build-up. The fine particles collected at the bottom of the GEV 260 are enriched in lignin particles. Because of this differentiation, these particles are potentially a valuable by-product as material for other processes (fuel, chemical feedstock, plastics/polymers, sticky binder), and may potentially be collected and transferred to a washing step or collection bin/auxiliary wash tank 270 before further use.

The biomass fines may exit via valve 263 to an auxiliary wash tank 270 (or just an output hopper for the fines without a wash step) for removal of fines for separate process due to economic value of the predominantly lignin fine particles. In some configurations, these enriched lignin particles may be re-blended back to the main product in the second wash chamber 280. In other configurations, the enriched lignin particles may be introduced after the drying process and before pelletization. In other configurations, the biomass fines may exit via valve 262 at the bottom of the GEV and subsequently be added to the second wash unit 280. In some configurations, the process may be designed to either re-blend the biomass fines into the product stream (via valve 262) or remove the fines to a separate product stream (via valve 263). In some configurations, the process may be design with both valves to allow for both options. In other configurations, only one valve/exit port 262, 263 may be present in same system.

The biomass output from the reaction vessel 240 and potentially the bottom of the GEV 260 may be fed into a separate wash chamber 280. This wash chamber 280 may comprise, for example, an agitated/stirred vat or a dynamic trommel system, wherein water is contacted with the biomass being conveyed via an auger up to drying section (290, 300, 310 in FIG. 2). While the biomass could be washed within the reaction vessel 240, a separate tank such as wash chamber 280 may provide better washing and better throughput for the reaction vessel, with better energy balance and reduced time wasted in reaction vessel 240 for a wash. It may also make the reaction vessel 240 easier and less expensive to manufacture. With the fibers of the biomass disrupted from the chemical/physical heat/pressure treatment in the reaction vessel 240, salts previously captured between the fibers and within the plant cells are now exposed to being dissolved by the water wash. By dissolving this recalcitrant salt, the salt can be subsequently removed by extruding the salt-laden water in the drying steps 290, 300 (see FIG. 2).

Furthermore, small organic materials are produced in the reaction vessel 240. These materials have been mostly freed by dissolving a fraction of the hemicellulose and side chain moieties broken-off from the hemicellulose, and include sugars, tannins, and small organic acids such as acetic acid. These materials also get washed out in the wash chamber 280, and in the water extrusion processes 290 and 300 along with the salts.

A distinct and separate wash chamber/tank 280 may also allow use of more material originally contaminated with salts such as sodium, potassium, and chloride that could have caused slagging, fouling, and corrosion in burners if they had not been washed out. Removal of this extra salt is important to economically use some biomass sources such as hogged/slash piles in the Northwest that have very high salt content. It also allows use, for instance, of an entire tree rather than just the heartwood because it can clean the dirt, salt, and light volatiles associated with, for instance, leaves from the material. By using entire trees, this process can use less expensive input biomass, including small invasive species like Eastern Red Cedar and mesquite that contain no economically viable heartwood. Typically, during the process described herein, sodium, potassium, and chlorine are reduced by 80 to 98 percent of their starting concentrations in the biomass.

In practice, there may be one or more reaction vessel/washing subsystems. In one configuration, four reaction vessel/washing subsystems may be provided that share a common GEV and subsequent drying subsection. By staggering the filling, reaction, explosion, and unloading times for each reaction vessel/washing subsystem, each of the four reaction vessel/washing subsystem may be performing a different stage in the process at any particular moment. In this manner, only one GEV, drying subsystem, etc., are required, thus simplifying and economizing the system as a whole. A more continual heating of several smaller reaction vessels or steam explosion vessels rather than the periodic, more intense heating of one larger vessel may provide a more efficient use of boiler steam/heat. Loading may be done more continuously, steam may be added more continuously (which means less stress for boiler and hence smaller boiler needed), and unloading may be done more continuously. Thus, the granularity of a batch process may be replaced with a more continuous process in terms of loading biomass, use of steam, and unloading biomass product. Sharing common equipment may also cut the capital costs of the plant.

As mentioned above, the washed biomass is moved from the post-reaction wash chamber 280 to the dryer sections 290, 300, and 310. The dryer sections may be comprised of several processes, and may utilize water separation/extrusion steps 290, 300. Mechanical drying may separate bulk water and dissolved salts and light volatile organic material from the beneficiated biomass through a vibratory screen separator 290 followed by a screw press and/or a roller press 300. The vibratory screen separator 290 (e.g., a vibratory screen separator such as those manufactured by SWECO™) allows water to flow through a screen at the bottom of a rotating/vibrating pan. By using two or more stages (for example, three stacked stages or three successive stages), such as a first screen with holes about 1 millimeter in diameter and subsequent screens with holes about 100 microns and then 39 microns in diameter, this "panning" arrangement allows bulk water flow through successively smaller holes while keeping the vast majority of biomass. The solid captured in each pan is pressed to the outside rim via a circular motion of the pan, eventually to find an off-ramp where it is removed and passed to the next step.

Figure 9:
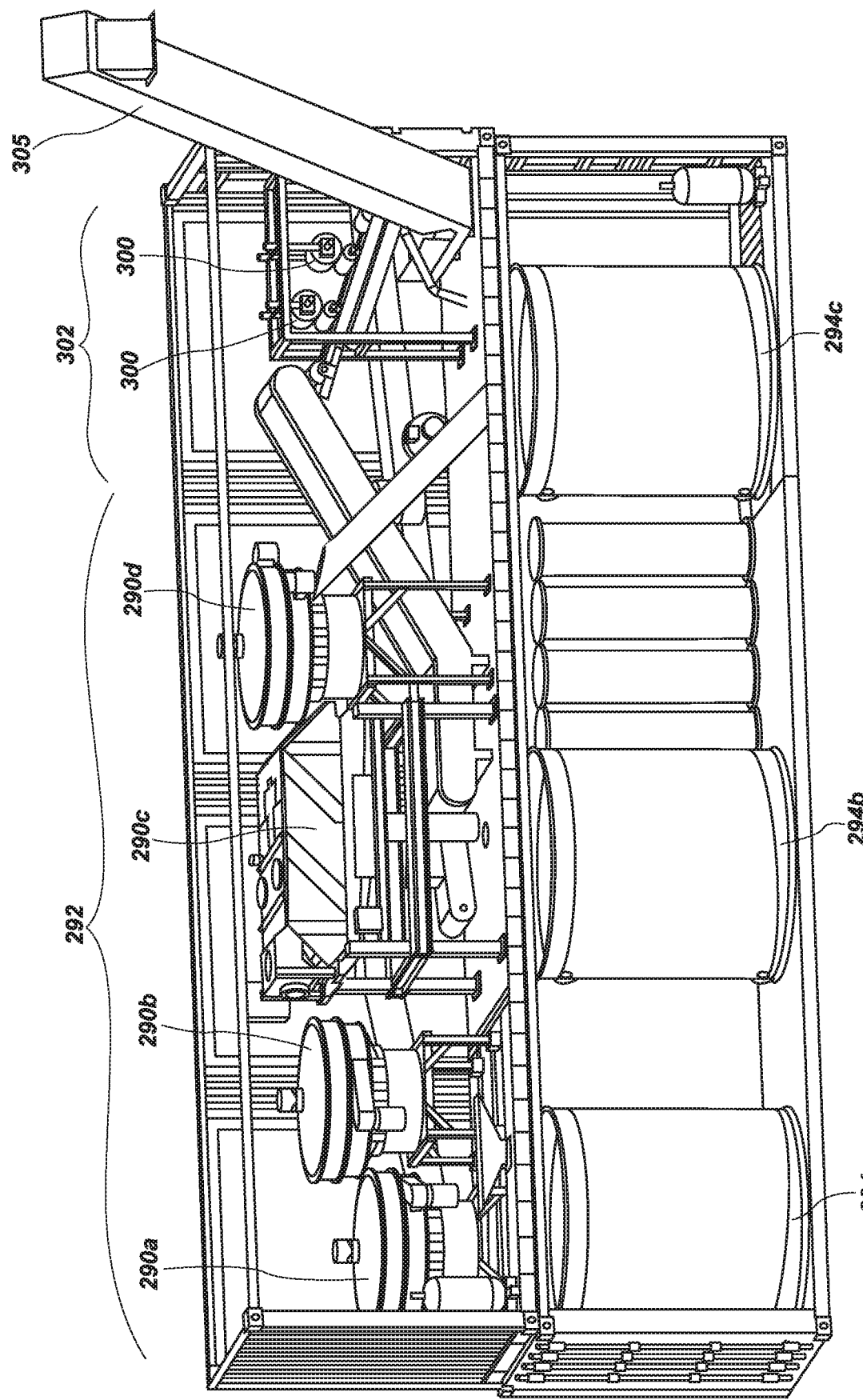
FIG. 9 shows a front, perspective view of an exemplary configuration of a dewatering module.
Figure 10:
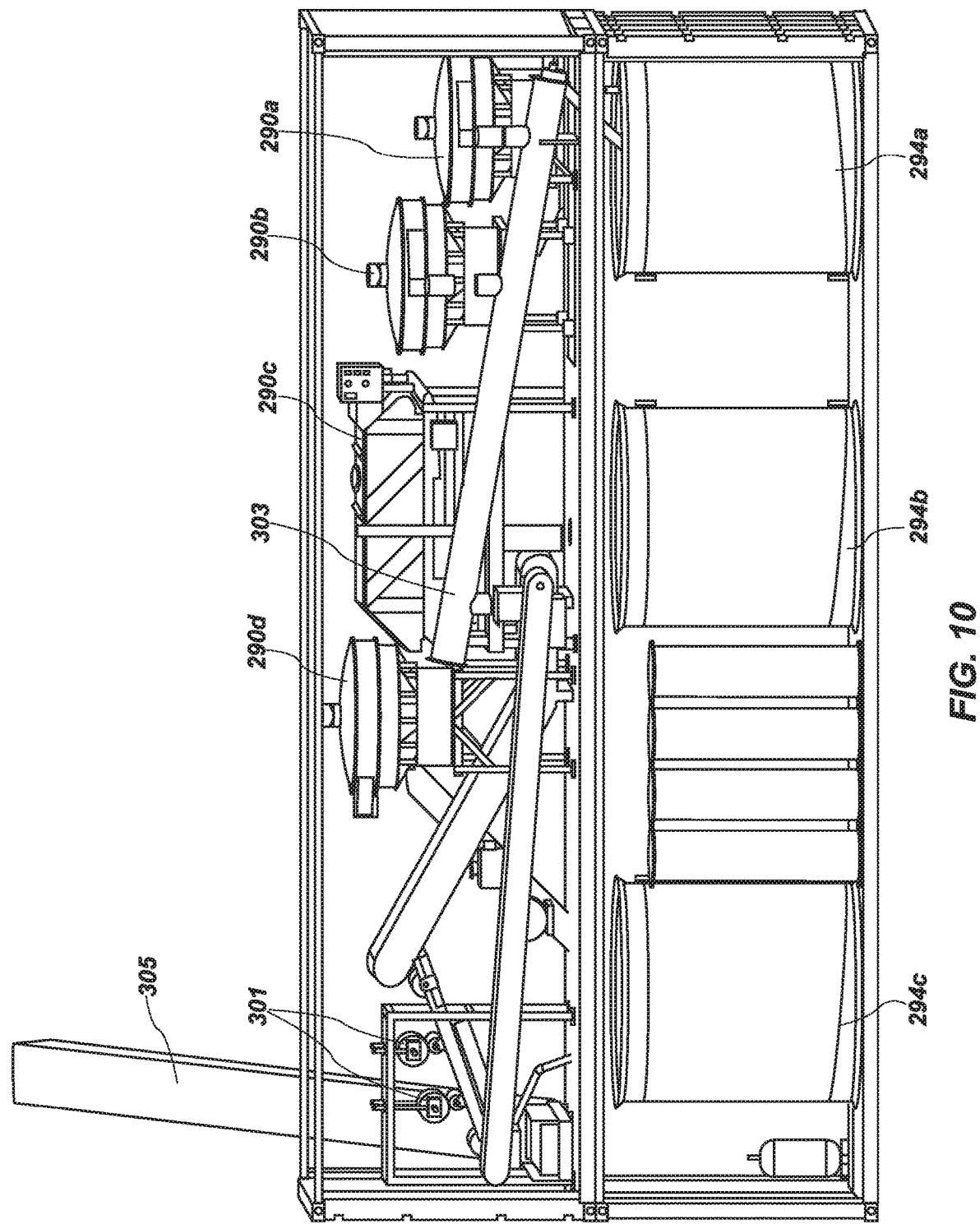
FIG. 10 shows a rear, perspective view of the dewatering module of FIG. 9.
Figure 11:
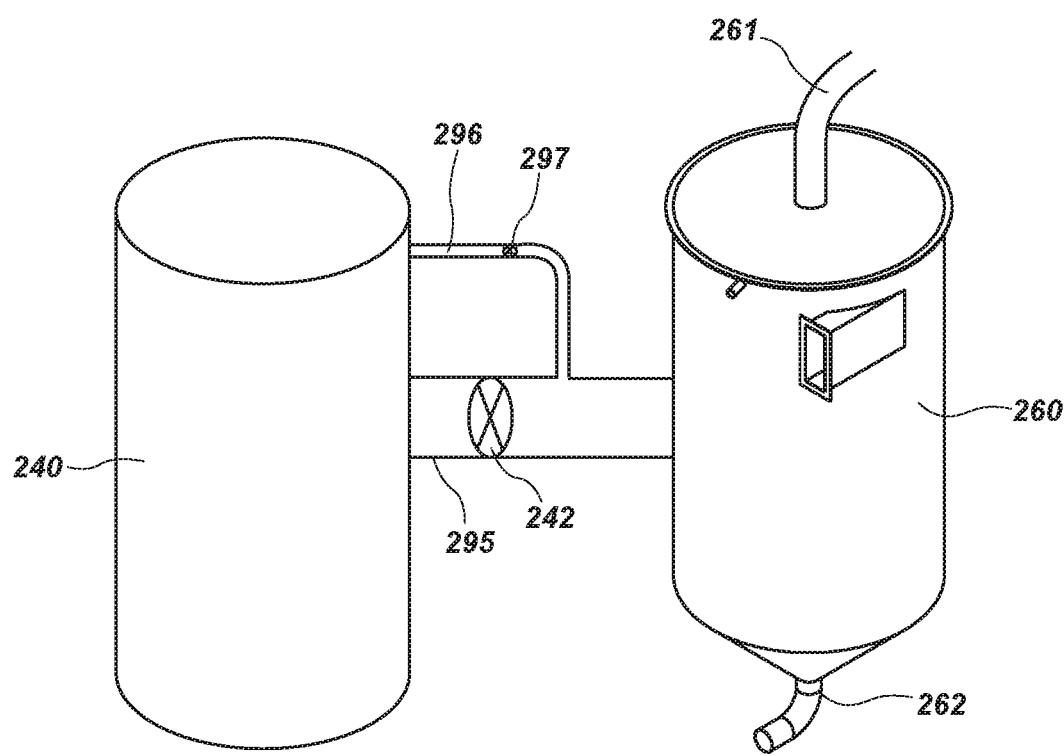
FIG. 11 shows a perspective view of a reaction vessel with two steam outlets.

FIG. 9 shows a front, perspective view of an exemplary configuration of a dewatering module comprising of one or more vibratory screen separators 290a, 290b, 290c, 290d and an extrusion dryer 300, and FIG. 10 shows a rear, perspective view of the dewatering module of FIG. 9. The dewatering module may generally consist of a vibratory separation section 292 (comprising one or more vibratory screen separators), and a pressing section 302 (comprising one or more presses). Below the vibratory separation section 292 and the pressing section 302, a bottom container having one or more storage tanks 294a-c may be provided.

Wet biomass may first enter the vibratory separation section 292, and be split to two vibratory screen separators 290a, b. These vibratory screen separators 290a, b may have, for example, 1 mm screens. Thus, biomass particles larger than 1 mm (>1 mm particles) may be captured by the screens and output to the pressing section 302. The water and small particles (<1 mm) may drop down to tank 294a.

The contents of tank 294a may be pumped up to the next vibratory screen separator 290c (in this example, a long SWEECO 290c as opposed to round SWEECO may be provided, but it will be appreciated that either long or round SWEECOs or other suitable screen separators may be used). The vibratory screen separator 290c may have a smaller screen, such as a screen of 0.1 mm (100 microns). The particles caught up in the screen (>100 micron particles) may be conveyed to the pressing section 302. The water and smaller particles (<100 micron particles) drop down to tank 294b.

The contents of tank 294b may be pumped up to a final vibratory screen separator 290d, which may have an even smaller screen size (for example, 39 microns). The particles caught up in the screen (for example, >39 micron particles) may be conveyed to the pressing section 302. The water and smallest particles (<39 microns) may drop down to tank 294c, and in some configurations may then be pumped to water treatment.

The pressing section 302 may include one or more of a simple press, a screw press, and/or a roller press. The particles caught by the vibratory screen separators may be subject to different types of pressing depending on their size. For example, the >100 micron and >39 micron particles may travel to the simple press, such as rollers 301, where water is squeezed from these small particles (water extruded may pass to tank 294c). The >1 mm particles may be subject to a screw press.

The material panned out of the vibratory screen separator(s) 290 may be quite wet, with a moisture content of around 80% and may be transferred to a screw press and/or roller press 300 (FIG. 2) for further extrusion. The screw press 303 (visible in FIG. 10) may comprise an auger, a screen, and an end plug, with the auger pushing the material against the screen and against the end plug which may be held place with air pressure (different pressures may be used depending on the desired outcomes; in some configurations, a pressure of about 50 psi may be used). Depending on the run conditions above (original maceration size, whether or not fines from gas expansion vessel have been added back in, retention time in the reaction vessel, etc.), there may be different size and softness of washed biomass. Smaller material may squeeze through screen, necessitating less pressure be applied to the plug. Larger or less soft material might plug the screw press, and may necessitate slower feed and throughput. The requirements of dryer material may also necessitate slowing down the screw press and maximizing plug pressure. Material squeezes out around the end plug at a moisture content of around 30% to 60% and may then be sent to a continuous roller press (such as rollers 301 in FIG. 10).

The roller press operates at an effective pressure of around at least 1000 psi, with around 2000 to 3000 psi being more typical. With the fibers and fiber cells disrupted by the reaction vessel processes and further sheared in the screw press, the water is accessible and is essentially "surface" water, amenable to extrusion via roller press. Without the fiber disruption caused by the reaction vessel, 10,000 psi would not be sufficient to obtain these results.

The rollers 301 of the roller press can be embossed with either a diamond or herringbone design, mainly to trap the biomass material and carry it under the rollers. The roller(s) 301 may have a permeable belt underneath, and a vacuum applied to the permeable belt under the roller may aid in sucking the water away. The shear forces exerted by the extrusion dryer(s) 300 (screw press and/or roller press) may pulverized the particles down to an average size of hundreds of microns. Material leaving the roller press may have moisture of content of around 30% or higher. After different sized particles are subject to their respective presses, they may be re-combined with the other particles.

Energy may be conserved and used throughout the process described herein, particularly the steam produced in the reaction vessel 240. For example, referring to the overall process in FIG. 2, steam/biomass fines/VOCs leave the reaction vessel 240 in steam explosion through rapid release valve 242 and go to the GEV 260. In the GEV 260, the biomass fines lose energy in the cyclone and drop to the bottom. The steam and VOCs escape (due to pressurization) through the downcomer pipe 261, which may be connected to the input hopper 220 through connection 221. The head space of the input hopper 220 may be large enough to accommodate this on-rush of pressure (with the headspace approximately equal to volume of biomass stored in hopper), and a pressure relief plate may be installed to keep the pressure below 5 psig (a thin-walled 55 gallon drum may withstand a pressure of 6 psig).

In the input hopper 220, the steam gives up most of its heat energy, condensing to hot water in contact with the input biomass, thus starting the chemical processes involved in beneficiation. As some of the steam condenses, it may heat the biomass to 100 to 120 degrees F. (40 to 50 degrees C.) to start the chemical processes.

Any remaining pressure from the steam explosion step is vented through pipe 222 or output 222 in input hopper 220, which may be connected to the boiler 250. In addition to this periodic pressure increases due to steam explosion, a fan may also be provided to drive the process by pulling air through fan/demister pad unit 265. The demister pad may remove the remaining steam/condensate and allow the VOCs to proceed to be mixed into the air intake of the boiler 250 and hence to be burned in the boiler rather than exhausted to the atmosphere. Thus, VOCs derived from the steam explosion step may be routed from the steam explosion vessel through the input hopper and directed to a boiler flame to incinerate the VOCs to eliminate emissions of light volatile organic compounds and simultaneously generate heat for the steam explosion step.

It will be appreciated that fabrication of the system may be accomplished many different ways. To facilitate assembly and maintain the possibility of moving the system to different sites without complete disassembly and re-assembly, components may be built to fit into standard transportation containers. This may also allow easy equipment movement. The containers may also provide inexpensive support structure for some of these components. Finally, the use of Victaulic-type couplings for non-pressurized pipe runs may have some advantages, including ease of assembly for containerized parts, cleaning out any clogs, and ease of maintenance.

EXAMPLES

The process employed a chipper to appropriately size and expose surface area. Generally, materials were macerated to about 1.27 to 0.635 centimeters (one-half to one-quarter inch) and smaller size, but larger pieces of biomass were used. As noted in Table 1, there was a tradeoff in chipping to smaller sizes versus the pressures/retention times required in the reactor. For example, 1.27 centimeter-sized (one-half-inch) Empty Fruit Bunch (EFB) could be beneficiated at 350 psi saturated steam and half hour retention time, while 5.08 centimeter-sized (2 inch) EFB required 385 psi saturated steam and 25 minutes retention time. Various reaction conditions are possible, and it will be appreciated that numerous combinations of reaction conditions are contemplated. Table I shows the chip size, solvent, temperature, etc., used for each type of biomass in one example. Table II shows the chip size, solvent, temperature, etc., used for each type of biomass in another example.

TABLE I

| | EMPTY FRUIT BUNCHES (EFB) | TRUNKS FROM MALAYSIAN PALM TREES | DOUGLAS FIR | HOGGED FUEL | MIXED WOOD IDAHO | PALLETS (KILN DRIED) |
|---|---|---|---|---|---|---|
| Chip size (inches) | 2 | ½ to 1 | 1 to 2 | ¼ to 1 | ⅛ to ¼ | sawdust |
| Solvent used in pre-wash | water | water | water | water | water | water |
| Temperature of the reaction vessel (degrees C.) | 190 to 195 | 200 to 202 | 200 to 202 | 200 to 202 | 200 to 202 | 201 to 204 |
| Pressure of the reaction vessel (psig) | 195 to 200 | 210 to 220 | 210 to 220 | 210 to 220 | 210 to 220 | 215 to 230 |
| Residence Time in reaction vessel (min) | 20 to 25 | 25 | 30 | 30 | 30 | 35 to 40 |
| Starting water content (%) | 8.8 | 67.8 | 55.6 | 30.4 | 27.5 | 3.7 |
| Final water content (%) | 8.5 | 7.1 | 4.7 | No data | 9.3 | 4.7 |
| % fixed carbon (dry basis) (start → finish) | 13.6 → 18.1 | 14.0 → 17.6 | 10.6 → 20.2 | 24.0 → 33.8 | 13.7 → 20.8 | 12.5 → 13.3 |

TABLE I-continued

| | EMPTY FRUIT BUNCHES (EFB) | TRUNKS FROM MALAYSIAN PALM TREES | DOUGLAS FIR | HOGGED FUEL | MIXED WOOD IDAHO | PALLETS (KILN DRIED) |
|---|---|---|---|---|---|---|
| % volatiles (d/b, both light and heavy volatiles) (start → finish) | 81.8 → 79.2 | 79.2 → 79.6 | 87.8 → 78.1 | 81.6 → 65.7 | 85.4 → 78.5 | 86.3 → 76.3 |
| % ash (d/b) (start → finish) | 2.84 → 2.96 | 6.26 → 2.60 | 0.10 → >0.10 | 0.92 → 0.73 | 0.75 → 0.38 | 0.63 → 0.56 |
| Heat content (BTU/pound) (start → finish) | 7939 → 9346 | 7758 → 8981 | 8443 → 9805 | 8923 → No data | 8699 → 9888 | 8796 → 9500 |
| Salt reduction $K^+$ (ppm) (start → finish) | 8720 → 344 | 24800 → 457 | 328 → <85 | 811 → No data | N/D | N/D |
| Salt Reduction $Na^+$ (ppm) (start → finish) | 131 → <100 | 515 → <100 | <95 → <85 | 115 → No Data | 612 → <100 | N/D |
| Salt reduction $Cl^-$ (wt %) (start → finish) | 0.12 → <0.10 | 1.22 → 0.13 | <0.10 → <0.10 | N/D | 0.11 → <0.10 | N/D |

TABLE II

| | Empty Fruit Bunches (EFB) | Trunks from Malaysian Palm Trees | Douglas Fir | Hogged Fuel | Mixed Wood Idaho | Pallets (kiln dried) |
|---|---|---|---|---|---|---|
| Chip size (inches) | 2 | ½ to 1 | 1 to 2 | ¼ to 1 | ⅛ to ¼ | sawdust |
| Solvent used in pre-wash | water | water | water | water | water | water |
| Pressure of reaction vessel (psig) | 385 to 400 | 400 to 420 | 410 to 420 | 410 to 420 | 410 to 420 | 415 to 430 |
| Temperature of reaction vessel (degrees C.) | 227 to 229 | 229 to 232 | 231 to 232 | 231 to 232 | 231 to 232 | 231 to 233 |
| Residence Time in reaction vessel (min) | 20 to 25 | 25 | 30 | 30 | 30 | 35 to 40 |
| Starting water content (%) | 8.8 | 67.8 | 55.6 | 30.4 | 27.5 | 3.7 |
| Final water content (%) | 8.5 | 7.1 | 4.8 | 10 | 9.3 | 4.7 |
| % fixed carbon (dry basis) (start → finish) | 13.6 → 18.1 | 14.0 → 17.6 | 10.6 → 20.2 | 24.0 → 33.8 | 13.7 → 20.8 | 12.5 → 13.3 |
| % volatiles (d/b, both light and heavy volatiles) (start → finish) | 81.8 → 79.2 | 79.2 → 79.6 | 87.8 → 78.1 | 81.6 → 65.7 | 85.4 → 78.5 | 86.3 → 76.3 |
| % ash (d/b) (start → finish) | 2.84 → 2.96 | 6.26 → 2.60 | 0.10 → >0.10 | 0.92 → 0.57 | 0.75 → 0.38 | 0.63 → 0.56 |
| Heat content (BTU/pound) (start → finish) | 7939 → 9346 | 7758 → 8981 | 8443 → 9805 | 8923 → 10,617 | 8699 → 9888 | 8796 → 9500 |
| Salt reduction $K^+$ (ppm) (start → finish) | 8720 → 344 | 24800 → 457 | 328 → <85 | 811 → 354 | N/D | N/D |
| Salt Reduction $Na^+$ (ppm) (start → finish) | 131 → <100 | 515 → <100 | 95 → <85 | 115 → <100 | 612 → <100 | N/D |

TABLE II-continued

| | Empty Fruit Bunches (EFB) | Trunks from Malaysian Palm Trees | Douglas Fir | Hogged Fuel | Mixed Wood Idaho | Pallets (kiln dried) |
|---|---|---|---|---|---|---|
| Salt reduction Cl⁻ (wt %) (start → finish) | 0.12 → <0.10 | 1.22 → 0.13 | <0.10 → <0.10 | 0.006 → <0.006 | 0.11 → <0.10 | N/D |

Pre-Wash Unit

The chipped biomass input is introduced to a pre-wash processing unit. For studies in Table I, the chips are placed into a stainless steel cylindrical cage, with a diameter of about 20 centimeters (about 8 inches), a length of about 3.13 meters (about 10 feet, 4 inches), a total volume of about 102 liters (6230 cubic inches), with 0.47 centimeters (3/16 inch) holes in the cage. The chips are placed in the stainless steel cylindrical cage, and both ends are closed. The loaded basket is washed with a hose and then dunked in a trough filled with water, where it is agitated for a minute and allowed to sit for about 10 to 15 minutes before being removed and allowed to drip for 3 to 5 minutes. Alternatively for Douglas Fir and Oregon Hogged Fuel, the chips are loaded into a trammel semi-submerged in water (trammel details above). The material is augered through the water in the trammel, where it empties to a conveyor belt and then dropped into the basket described above.

Reaction Vessel or Steam Explosion Vessel

The basket or cage, still dripping wet from the previous wash step, is slid into the reactor through an open o-port, which is then closed. Steam from a boiler is applied to the 290 psi limit the boiler can supply. From there, the temperature and pressure are increased by heating the reaction vessel or steam explosion vessel 240 with electric band-heaters surrounding the stainless steel reactor to reach the desired pressure of around 400 psi. If necessary, further reaction time is allowed at the final desired pressure. The reaction vessel's temperature, pressure, and biomass residence time are carefully controlled so as to optimize process conditions for a particular biomass input as set forth in Table I.

After a desired reaction time, the rapid release valve is opened in <0.5 seconds. In the studies for Table I, this valve consisted of a 3" diameter pneumatically actuated ball valve pressurized to 130 to 150 psi. The resulting rapid pressure release produced a stream of outrushing steam that is piped to the gas expansion vessel. The perforated screen, which had allowed a better ingress of the steam to the biomass, now gives a larger cross section for rapid release and egress.

Gas Expansion Vessel

In addition to the beneficiated material left in the basket, fine particles of beneficiated biomass are entrained in the stream of released steam. A gas expansion vessel is used to control the outrush and capture the entrained biomass. The gas expansion vessel is a large-volume cyclone in which the outrushing steam is introduced tangentially. A downcomer pipe 261 is built into the center top of the gas expansion vessel to give the steam eventual egress so the pressure inside the gas expansion vessel remains low. As the energy of the resulting vortex is scrubbed through expansion and friction, biomass particles drop out to the bottom of the gas expansion vessel where they are collected, and the steam escapes through the downcomer pipe 261 to avoid pressure build-up. The fine particles are collected and transferred to the second wash unit where they are recombined with the contents of the basket.

Second Wash Unit

The biomass output from the reaction vessel and the bottom of the gas expansion vessel may be fed into a separate, second wash chamber. This wash chamber may comprises a vat agitated/stirred by compressed air, wherein clean water is contacted with the biomass. With the fibers of the biomass disrupted from the chemical and physical heat and pressure treatment in the reaction vessel, salts previously captured between the fibers and within the plant cells are exposed and dissolved by the water wash. By dissolving these recalcitrant salts, the salts (especially consisting of sodium, potassium, and chloride ions which cause corrosion, slagging and fouling) are subsequently removed by extruding the salt-laden water in the drying steps. Furthermore, small organic materials are produced in the reactor. These light volatile materials also get washed out in the wash chamber/water extrusion processes along with the salts.

To determine the amount of light volatile material removed, the weight of material lost upon heating from 105 degrees C. to 250 degrees C. is measured, for the raw biomass and for the beneficiated biomass. The material is first heated to 105° C. to drive off the moisture in the material. The dried weight is noted after the material reaches a steady weight (typically 45 minutes to 1 hour). The material is then heated to 225° C. for several minutes, followed by 5° incremental temperature increases to 250° C. After an hour, the weight stabilizes and is noted. The weight loss represents the amount of light volatile material that could be problematic in subsequent use as a fuel. As noted in Table I, on a dry basis, herbaceous material went from a range of 40 to 70% down to a range of 30 to 40%, soft woods went from a range of 60 to 80% down to a range of 30 to 50%, and hard woods went from a range of 40 to 50% down to a range of 35 to 45%.

Dryer Sections

The washed biomass slurry may be ready at this point in the process for use as an engineered soil. If desired, it may be pumped from the post-reaction wash section to the dryer sections. The final desired water content may be high enough that no further drying is required. If drying is required, the following steps may be taken. The dryer sections are comprised of several processes, using water separation/extrusion steps. Bulk water is separated from the beneficiated biomass through a vibratory screen separator (SWECO Vibro-Energy Separator) or filter sock (50 micron filter) followed by a screw press (Vincent Screw Press). The vibratory screen separator allowed free water to flow through a screen at the bottom of stacked rotating/vibrating pans. Three stacks are used with screen sizes of 1 mm, 100 micron, and 39 micron screens. This panning arrangement allows bulk water seep through while keeping the vast majority of biomass on top of the three screens. The resulting water is only faintly colored—any further screening for smaller particles may not be cost effective. The solid captured in each pan is pressed to the outside rim via a circular motion of the pan, eventually to find an off-ramp where it is removed and passed to the next step.

The use of three stacked pans to capture the material rather than just one pan using the 39 micron screen may decrease clogging the screen. By spreading the material by size through three screens rather than only one with the very smallest hole size, the potential to clog reduces, thereby letting the water to drip through the screens rather than ponding on the surface of a clog.

The material panned out of the vibratory screen separator or removed from the filter sock is wet, with moisture contents different for different sized particle layers. A moisture content of 80 to 85% remains in the 39 to 100 micron fraction, while the larger-sized fractions retain 70 to 80% moisture content.

The combined material is transferred to a screen compression press for further water extrusion. An auger pushes the material against a screen and against an end plug held in place with about 50 psi pressure. Material squeezed out around the end plug at a moisture content of about 45 to about 60%. The shear forces exerted by the screw press pulverize the particles down to an average size of hundreds of microns.

According to another aspect, the washed biomass material, after it passes through the reaction vessel or steam explosion vessel, either with or without the predominantly lignin particles from the GEV, may be suitable for use as an engineered soil. After processing in the reaction vessel, the biomass material typically has a pH of about 4 and a moisture content of between 50 to 75 percent. If desired, the material may be further dried (such as by passing through vibratory screen separators and/or a screw press as described above). The steam explosion vessel disrupts the cross-linking barriers in biomass in order to defeat fresh biomass recalcitrance and produce a peat-like substance. As such, it can be used as is as a peat replacement or sent to a mixing and addition station, where other ingredients may be added, resulting in a soil enhancement product. Possible additions include, for example, neutralization with lime or calcium carbonate, or other materials like urea for nitrogen content, or potash for potassium content. Likewise, if the recovered fine particles from the GEV are kept separate, they can be used either without further treatment or sent to their own mixing and addition station, to result in a separate final product.

Disclosed herein is a process for producing an engineered soil, comprising: collecting raw biomass in an input hopper; prewashing the raw biomass in a prewash container to remove contaminants; preheating the raw biomass to weaken cells walls of the raw biomass and initiate breaking of hydrogen bonds, wet oxidation and acid hydrolysis of the biomass; pressurizing the prewashed and preheated biomass in a reaction vessel, wherein the reaction vessel comprises an inner perforated screen separating the biomass from the main body of the reaction vessel and with one or more perforated screen fingers disposed within the reaction vessel and positioned within the biomass to increase exposure of the biomass to steam; rapidly depressurizing the reaction vessel to disrupt a structure of the biomass and release biomass salts and light volatile organic compounds entrained within the biomass and produce steam containing at least partially lignin-enriched fine particles; releasing the steam and condensed steam from the reaction vessel entrained with fine lignin-enriched particles into a cyclone-type gas expansion and gas-release vessel configured to capture the entrained fine lignin-enriched particles from the steam; routing the steam from the gas expansion vessel to the input hopper to recapture heat from the captured steam and steam condensate to heat and wet the biomass in the input hopper; subjecting the disrupted biomass to a second washing step to remove additional salts and light volatile organic compounds derived from the disrupted biomass; mechanically removing a portion of water from the biomass with continuous throughput water removal steps, wherein the resulting biomass comprises less than about 50% water by weight and wherein additional salts and light organic compounds derived from the disrupted biomass are removed with the water.

Within the process described above, the raw biomass may be macerated to a size of less than about 1.5 inches. Within the process described above, the raw biomass may be macerated to a size of less than about 1.0 inches. Within the process described above, the raw biomass may be macerated to a size of less than about 0.5 inches. Within the process described above, the raw biomass may be macerated to a size of less than about 0.25 inches.

Within the process described above, the contaminants of the prewash step may include dirt, rocks/pebbles, salts, and/or other debris. The prewash step may further comprise adding chemicals suitable for permeating and disrupting biomass fibers and promoting wet oxidation and/or acid hydrolysis to disrupt hemicellulose and lignin cross-linking, and solubilize other contaminants. The chemicals may be selected from methanol, ammonium carbonate, carbonic acid, ammonia, acetone, and acetonitrile.

Within the process described above, the reaction vessel may comprise at least one perforated finger screen extending into the biomass. The at least one perforated finger screen may comprises at least one screen liner. The reaction vessel may further comprise at least one offset butterfly valve configured to release steam. The at least one offset butterfly valve releases pressure in less than about 500 msec. The offset butterfly valve may comprises two or more offset butterfly valves.

Within the process described above, volatile organic compounds derived from the steam explosion step may be routed from the reaction vessel through the input hopper and directed to a boiler flame to incinerate the volatile organic compounds to eliminate emissions of light volatile organic compounds and simultaneously generate heat for the steam explosion step.

The process described above may be performed in a vertical orientation to facilitate gravitational feeding of the biomass and unloading of the processed biomass.

The process described above may further comprise the step of mechanical drying through vibratory separation followed by compression in a screw press. The step of mechanical drying through vibratory separation may comprise a first separation of biomass using a screen having about 1 mm holes and at least a second separation of biomass using at least one screen having one of: about 100 micron holes and about 39 micron holes.

The process may further comprise the step of removing additional amounts of water in a continuous roller press. The roller press may be operated at a pressure of at least 1,000 psi. The roller press may be operated at a pressure of from about 2000 to 3000 psi.

The process may further comprise the step of collecting the entrained fine particles from the gas expansion vessel and combining the fine particles with the biomass.

The step of mechanically removing a portion of water from the biomass with a continuous throughput water removal step comprises one or more of a vibratory screen, a compression auger, a roller press, and a screw press.

The prewashing step may comprise using a trommel having an inclined screw/auger surrounded by a screen in a partially-filled water tank and the biomass is wetted as it moves upward along the screw/auger while dirt is mechanically separated and falls through the screen to a removal container.

The perforated screen fingers may be positioned away from a wall of the reaction vessel to maximize exposure of the biomass to the steam.

Described herein is an improved process for separating a beneficiated solid biomass fuel entrained in steam, comprising: pressurizing biomass in a reaction vessel; rapidly depressurizing the reaction vessel to disrupt the biomass structure and release biomass salts and light volatile organic compounds entrained within the biomass and produce steam and condensed steam containing at least partially lignin-enriched fine particles; and releasing the steam and condensed steam from the reaction vessel entrained with fine lignin-enriched particles into a cyclone-type gas expansion vessel configured to separate the entrained fine lignin-enriched particles from the steam, wherein the gas expansion vessel comprises a down tube extending from the top of the gas expansion vessel to a position below which the fines, steam and condensed steam from the reaction vessel is introduced in the cyclone-type gas expansion vessel, wherein a bottom of the down tube comprises a steam input and a top of the down tube comprises a steam exit, wherein the down tube releases steam from the gas expansion vessel into the downtube input and the fine lignin-enriched particles drop below the down tube input and are collected. The released steam and condensed steam from the reaction vessel may be introduced into the cyclone-type gas expansion vessel tangentially.

Described herein is a process for producing a beneficiated solid biomass fuel, comprising: pressurizing a biomass in a reaction vessel, wherein the reaction vessel comprises an inner perforated screen separating the biomass from the main body of the reaction vessel and with one or more perforated screen fingers disposed within the reaction vessel and positioned within the biomass to increase exposure of the biomass to steam; rapidly depressurizing the reaction vessel to disrupt the biomass structure and release biomass salts and light volatile organic compounds entrained within the biomass; and separating the salts and light volatile organic compounds from the disrupted biomass to produce a biomass having reduced salts and light volatile organic compounds.

A gas expansion vessel for separating biomass from steam and steam condensate, comprising a vessel comprising a circular wall with a top and bottom, a down tube extending from the top of the gas expansion vessel where it forms an exit and extends to a position below which the steam and condensed steam from the reaction vessel is introduced in the cyclone-type gas expansion vessel where it forms a down tube input, wherein the down tube releases steam from the gas expansion vessel into the downtube input and the fine lignin-enriched particles drop below the down tube input and are collected. The gas expansion vessel may comprise an input configured to introduce steam, VOCs, and steam condensate entrained with fine lignin-enriched particles tangentially into the gas expansion vessel at a position above the down tube input.

A system for producing a beneficiated solid biomass fuel, comprising: a raw biomass input hopper; a prewashing container configured to remove contaminants; a reaction vessel comprising an inner perforated screen for separating the biomass from the main body of the reaction vessel; a cyclone-type gas expansion vessel configured to capture steam from the reaction vessel and introduce such steam and condensed steam tangentially into the gas expansion vessel, rapidly circulate the steam entrained with fine lignin-enriched particles and separate from the steam the entrained fine lignin-enriched particles; a routing system for routing the steam, volatile organic compounds, and steam condensate from the gas expansion vessel to the input hopper to recapture heat from the captured steam and steam condensate and heat the biomass in the input hopper; a second washing container configured to remove additional salts and light volatile organic compounds derived from the disrupted biomass; a mechanical continuous water removal mechanism configured to remove water from the biomass to produce a biomass having less than about 50% water by weight and to remove from the water additional salts and light organic compounds derived from the disrupted biomass.

The system may further comprise a routing and fan-driven system for routing the steam and the volatile organic compounds to a de-mister pad to remove the steam via condensation. The system may further comprise a routing and fan-driven system for routing remaining volatile organic compounds to an air input of a boiler for incineration. The system may further comprise one or more perforated screen fingers disposed within the reaction vessel and positioned within the biomass to increase exposure of the biomass to steam. The one or more perforated screen fingers may be positioned away from a wall of the reaction vessel.

The reaction vessel further comprises at least one offset butterfly valve configured to release steam. The offset butterfly valve may be configured to release pressure from the reaction vessel in less than about 500 msec. The at least one offset butterfly valve configured to release steam may comprise two or more offset butterfly valves, the two or more offset butterfly valves having a combined cross section approximately equal to the cross section of the at least one offset butterfly valve.

The various embodiments described above can be combined to provide further embodiments. All of the U.S. patents, U.S. patent application publications, U.S. patent applications, foreign patents, foreign patent applications and non-patent publications referred to in this specification, in their entirety. The present application claims priority to, and incorporates by reference in its entirety, U.S. provisional application 62/508,043, filed May 18, 2017, and U.S. non-provisional application Ser. No. 15/877,937, filed Jan. 23, 2018. Aspects of the embodiments can be modified, if necessary to employ concepts of the various patents, applications and publications to provide yet further embodiments.

Thus there is disclosed multiple configurations, systems, and methods for beneficiating and cleaning biomass. It will be appreciated that numerous modifications may be made without departing from the scope and spirit of this disclosure. The appended claims are intended to cover such modifications.

The present invention relates also especially to following aspects:

Aspect 1: A process for producing a beneficiated solid biomass fuel, comprising: collecting raw biomass in an input hopper;

prewashing the raw biomass in a prewash container to remove contaminants;

preheating the raw biomass to weaken cells walls of the raw biomass and initiate breaking of hydrogen bonds, wet oxidation and acid hydrolysis of the biomass;

pressurizing the prewashed and preheated biomass in a reaction vessel, wherein the reaction vessel comprises an inner perforated screen separating the biomass from the main body of the reaction vessel and with one or more perforated screen fingers disposed within the reaction vessel and positioned within the biomass to increase exposure of the biomass to steam;

rapidly depressurizing the reaction vessel to disrupt a structure of the biomass and release biomass salts and light volatile organic compounds entrained within the biomass and produce steam containing at least partially lignin-enriched fine particles;

releasing the steam and condensed steam from the reaction vessel entrained with fine lignin-enriched particles into a cyclone-type gas expansion and gas-release vessel configured to capture the entrained fine lignin-enriched particles from the steam;

routing the steam from the gas expansion vessel to the input hopper to recapture heat from the captured steam and steam condensate to heat and wet the biomass in the input hopper;

subjecting the disrupted biomass to a second washing step to remove additional salts and light volatile organic compounds derived from the disrupted biomass;

mechanically removing a portion of water from the biomass with continuous throughput water removal steps, wherein the resulting biomass comprises less than about 50% water by weight and wherein additional salts and light organic compounds derived from the disrupted biomass are removed with the water.

Aspect 2: The process of aspect 1 or aspect 30 or aspect 32, wherein the raw biomass is macerated to a size of less than about 1.5 inches.

Aspect 3: The process of aspect 1 or aspect 30 or aspect 32, wherein the raw biomass is macerated to a size of less than about 1.0 inches.

Aspect 4: The process of aspect 1 or aspect 30 or aspect 32, wherein the raw biomass is macerated to a size of less than about 0.5 inches.

Aspect 5: The process of aspect 1 or aspect 30 or aspect 32, wherein the raw biomass is macerated to a size of less than about 0.25 inches.

Aspect 6: The process of aspect 1 or aspect 30 or aspect 32, wherein the contaminants of the prewash step include dirt, rocks/pebbles, salts, and/or other debris.

Aspect 7: The process of aspect 1 or aspect 30 or aspect 32, wherein the prewash step further comprises adding chemicals suitable for permeating and disrupting biomass fibers and promoting wet oxidation and/or acid hydrolysis to disrupt hemicellulose and lignin cross-linking, and solubilize other contaminants.

Aspect 8: The process of aspect 7, wherein the chemicals are selected from methanol, ammonium carbonate, carbonic acid, ammonia, acetone, and acetonitrile.

Aspect 9: The process of aspect 1 or aspect 30 or aspect 32, wherein the reaction vessel comprises at least one perforated finger screen extending into the biomass.

Aspect 10: The process of aspect 9, wherein the at least one perforated finger screen comprises at least one screen liner.

Aspect 11: The process of aspect 1 or aspect 30 or aspect 32, wherein volatile organic compounds derived from the steam explosion step are routed from the reaction vessel through the input hopper and directed to a boiler flame to incinerate the volatile organic compounds to eliminate emissions of light volatile organic compounds and simultaneously generate heat for the steam explosion step.

Aspect 12: The process of aspect 1 or aspect 30 or aspect 32, wherein the process is performed in a vertical orientation to facilitate gravitational feeding of the biomass and unloading of the processed biomass.

Aspect 13: The process of aspect 1 or aspect 30 or aspect 32, wherein the reaction vessel further comprises at least one offset butterfly valve configured to release steam.

Aspect 14: The process of aspect 13, wherein the at least one offset butterfly valve releases pressure in less than about 500 msec.

Aspect 15: The process of aspect 13 or of aspect 14, wherein the offset butterfly valve comprises two or more offset butterfly valves.

Aspect 16: The process of aspect 1 or aspect 30 or aspect 32, further comprising the step of mechanical drying through vibratory separation followed by compression in a screw press.

Aspect 17: The process of aspect 16, wherein the step of mechanical drying through vibratory separation comprises a first separation of biomass using a screen having about 1 mm holes and at least a second separation of biomass using at least one screen having one of: about 100 micron holes and about 39 micron holes.

Aspect 18: The process of aspect 16 or aspect 17, further comprising the step of removing additional amounts of water in a continuous roller press.

Aspect 19: The process of aspect 18, wherein the roller press is operated at a pressure of at least 1,000 psi.

Aspect 20: The process of aspect 19, wherein the roller press is operated at a pressure of from about 2000 to 3000 psi.

Aspect 23: The process of aspect 1 or aspect 30 or aspect 32, further comprising the step of collecting the entrained fine particles from the gas expansion vessel and combining the fine particles with the biomass.

Aspect 25: The process of aspect 24, wherein the pellet is formed by combining the biomass with dried fine lignin-enriched particles derived from the gas expansion vessel.

Aspect 27: The process of aspect 1 or aspect 30 or aspect 32, wherein the mechanically removing of a portion of water from the biomass with a continuous throughput water removal step comprises one or more of a vibratory screen, a compression auger, a roller press, and a screw press.

Aspect 28: The process of aspect 1 or aspect 30 or aspect 32, wherein the prewashing step comprises using a trommel having an inclined screw/auger surrounded by a screen in a partially-filled water tank and the biomass is wetted as it moves upward along the screw/auger while dirt is mechanically separated and falls through the screen to a removal container.

Aspect 29: The process of aspect 1 or aspect 30 or aspect 32, wherein the perforated screen fingers are positioned away from a wall of the reaction vessel to maximize exposure of the biomass to the steam.

Aspect 30: An improved process for separating a beneficiated solid biomass fuel entrained in steam, comprising:

pressurizing biomass in a reaction vessel;

rapidly depressurizing the reaction vessel to disrupt the biomass structure and release biomass salts and light volatile organic compounds entrained within the biomass and produce steam and condensed steam containing at least partially lignin-enriched fine particles; and releasing the steam and condensed steam from the reaction vessel entrained with fine lignin-enriched particles into a cyclone-type gas expansion vessel configured to separate the entrained fine lignin-enriched particles from the steam, wherein the gas expansion vessel comprises a down tube extending from the top of the gas expansion vessel to a position below which the fines, steam and condensed steam from the reaction vessel is introduced in the cyclone-type gas expansion vessel, wherein a bottom of the down tube comprises a steam input and a top of the down tube comprises a steam exit, wherein the down tube releases steam from the gas expansion vessel into the downtube input and the fine lignin-enriched particles drop below the down tube input and are collected.

Aspect 31: The process of aspect 1 or aspect 30 or aspect 32, wherein the released steam and condensed steam from the reaction vessel is introduced into the cyclone-type gas expansion vessel tangentially.

Aspect 32: A process for producing a beneficiated solid biomass fuel, comprising:
pressurizing a biomass in a reaction vessel, wherein the reaction vessel comprises an inner perforated screen separating the biomass from the main body of the reaction vessel and with one or more perforated screen fingers disposed within the reaction vessel and positioned within the biomass to increase exposure of the biomass to steam;
rapidly depressurizing the reaction vessel to disrupt the biomass structure and release biomass salts and light volatile organic compounds entrained within the biomass; and
separating the salts and light volatile organic compounds from the disrupted biomass to produce a biomass having reduced salts and light volatile organic compounds.

Aspect 33: An apparatus for producing a beneficiated solid biomass fuel, comprising:
a reaction vessel for pressurizing a biomass and rapidly depressurizing the vessel to disrupt the biomass structure and release biomass salts and light volatile organic compounds entrained within the biomass and produce steam and condensed steam containing at least partially lignin-enriched fine particles,
wherein the reaction vessel comprises an inner perforated screen separating the biomass from the walls of the reaction vessel,
wherein the inner perforated screen further comprises one or more perforated screen fingers positioned within the biomass during pressurization of the biomass to increase exposure of the biomass to steam.

Aspect 34: The system or apparatus of aspect 33, wherein the one or more perforated screen fingers are positioned away from a wall defining the reaction vessel.

Aspect 35: The system or apparatus of aspect 34, wherein the plurality of perforated finger screen liners comprises screen liners having a plurality of screen hole sizes.

Aspect 36: A gas expansion vessel for separating biomass from steam and steam condensate, comprising a vessel comprising a circular wall with a top and bottom, a down tube extending from the top of the gas expansion vessel where it forms an exit and extends to a position below which the steam and condensed steam from the reaction vessel is introduced in the cyclone-type gas expansion vessel where it forms a down tube input, wherein the down tube releases steam from the gas expansion vessel into the downtube input and the fine lignin-enriched particles drop below the down tube input and are collected.

Aspect 37: The system or apparatus or gas expansion vessel of aspect 33 or aspect 35 or aspect 36, wherein the input is configured to introduce steam, VOGs, and steam condensate entrained with fine lignin-enriched particles tangentially into the gas expansion vessel at a position above the down tube input.

Aspect 38: A system for producing a beneficiated solid biomass fuel, comprising:
a raw biomass input hopper;
a prewashing container configured to remove contaminants;
a reaction vessel comprising an inner perforated screen for separating the biomass from the main body of the reaction vessel;
a cyclone-type gas expansion vessel configured to capture steam from the reaction vessel and introduce such steam and condensed steam tangentially into the gas expansion vessel, rapidly circulate the steam entrained with fine lignin-enriched particles and separate from the steam the entrained fine lignin-enriched particles;
a routing system for routing the steam, volatile organic compounds, and steam condensate from the gas expansion vessel to the input hopper to recapture heat from the captured steam and steam condensate and heat the biomass in the input hopper;
a second washing container configured to remove additional salts and light volatile organic compounds derived from the disrupted biomass;
a mechanical continuous water removal mechanism configured to remove water from the biomass to produce a biomass having less than about 50% water by weight and to remove from the water additional salts and light organic compounds derived from the disrupted biomass.

Aspect 39: The system of aspect 38, further comprising a routing and fan-driven system for routing the steam and the volatile organic compounds to a de-mister pad to remove the steam via condensation.

Aspect 40: The system of aspect 39, further comprising a routing and fan-driven system for routing remaining volatile organic compounds to an air input of a boiler for incineration.

Aspect 41: The system of aspect 38, further comprising one or more perforated screen fingers disposed within the reaction vessel and positioned within the biomass to increase exposure of the biomass to steam.

Aspect 42: The system of aspect 38, wherein the one or more perforated screen fingers are positioned away from a wall of the reaction vessel.

Aspect 43: The system or process of aspect 38, wherein the reaction vessel further comprises at least one offset butterfly valve configured to release steam.

Aspect 44: The system or process of aspect 43, wherein the offset butterfly valve is configured to release pressure from the reaction vessel in less than about 500 msec.

Aspect 45: The system or process of aspect 38, wherein the at least one offset butterfly valve configured to release steam comprises two or more offset butterfly valves, the two or more offset butterfly valves having a combined cross section approximately equal to the cross section of the at least one offset butterfly valve.

Aspect 46: A method for producing an engineered soil from raw biomass, the method comprising the steps of:
placing the raw biomass into a reaction vessel; wherein the reaction vessel comprises a main body and an inner perforated screen separating the raw biomass from the main body, and wherein the reaction vessel comprises one or more perforated screen fingers disposed within the reaction vessel and positioned within the raw biomass to increase exposure of the preheated biomass to steam;
pressurizing the raw biomass in the reaction vessel; and
rapidly depressurizing the reaction vessel to disrupt a structure of the biomass.

Aspect 47: The method of aspect 46, wherein the step of rapidly depressurizing the reaction vessel comprises rapidly depressurizing the reaction vessel to produce steam containing at least partially fine lignin-enriched particles.

Aspect 48: The method of aspect 47, further comprising the step of releasing the steam from the reaction vessel containing at least partially fine lignin-enriched particles into a cyclone-type gas expansion vessel configured to capture the entrained fine lignin-enriched particles from the steam.

Aspect 49: The method of aspect 48, further comprising the step of routing at least a portion of the steam from the cyclone-type gas expansion vessel to an input hopper to recapture heat from the captured steam to heat and wet the biomass in the input hopper.

Aspect 50: The method of aspect 49, further comprising the step of subjecting the disrupted biomass to a washing step to remove at least one of salts and light volatile organic compounds derived from the disrupted biomass.

Aspect 51: The method of aspect 46, further comprising the step of prewashing the raw biomass in a prewash container to remove contaminants.

Aspect 52: The method of aspect 46, wherein one or more perforated screen fingers are positioned away from a wall of the reaction vessel to maximize exposure of the raw biomass to the steam.

Aspect 53: The method of aspect 46, wherein the one or more perforated screen fingers comprises at least one screen liner.

Aspect 54: The method of claim 46, wherein the step of rapidly depressurizing the reaction vessel comprises opening of a rapid depressurization valve a first time for about 1 second, waiting a predetermined amount of time, and opening the rapid depressurization valve a second time.

Aspect 55: The method of aspect 46, wherein the step of rapidly depressurizing the reaction vessel comprises opening of a rapid depressurization valve a first time for about 1 second, waiting at least one minute, and opening the rapid depressurization valve a second time for about 1 second.

Aspect 56: The method of aspect 46, further comprising the step of mixing at least one additive into the biomass after it has been rapidly depressurized.

Aspect 57: The method of aspect 56, wherein the at least one additive comprises at least one of lime, calcium carbonate, urea, a microorganism, and potash.

Aspect 58: A system for producing engineered soil, the system comprising:

a reaction vessel for pressurizing a biomass located therein and rapidly depressurizing the biomass to disrupt a structure of the biomass, wherein the reaction vessel comprises a wall and an inner perforated screen separating the biomass from the wall of the reaction vessel.

Aspect 59: The system of aspect 58, wherein the inner perforated screen further comprises one or more perforated screen fingers positioned within the biomass during pressurization of the biomass to increase exposure of the biomass to steam.

Aspect 60: The system of aspect 59, wherein the one or more perforated screen fingers are positioned away from the wall defining the reaction vessel.

Aspect 61: The system of aspect 60, wherein the plurality of perforated finger screen liners comprises screen liners having a plurality of screen hole sizes.

Aspect 62: The system of aspect 59, wherein the system further comprises a rapid depressurization valve in communication with the reaction vessel.

Aspect 63: The system of aspect 59, further comprising a prewashing container configured to remove contaminants.

Aspect 64: The system of aspect 59, further comprising a cyclone-type gas expansion vessel configured to capture steam from the reaction vessel and introduce such steam tangentially into the gas expansion vessel, rapidly circulate the steam and separate from the steam one or more entrained fine lignin-enriched particles.

Aspect 65: The system of aspect 59, wherein the reaction vessel comprises at least two steam outlets.

Aspect 66: The system of aspect 65, wherein the reaction vessel further comprises a rapid depressurization valve in connection with at least one of the at least two steam outlets.

Aspect 67: The system of aspect 66, wherein the at least two steam outlets comprise a first steam outlet in connection with the rapid depressurization valve and a second steam outlet in connection with a depressurization valve.

Aspect 68: The system of aspect 67, wherein the rapid depressurization valve is in connection with a first outlet pipe having a diameter of at least 25 centimeters.

Aspect 69: The system of aspect 67, wherein the depressurization valve is in connection with a second outlet pipe having a diameter of at least 4 centimeters.

Aspect 70: An engineered soil prepared according to the method of aspect 46.

Aspect 71: An engineered soil prepared by a process which comprises the steps of:

placing a raw biomass into a reaction vessel; wherein the reaction vessel comprises a main body and an inner perforated screen separating the raw biomass from the main body, and wherein the reaction vessel comprises one or more perforated screen fingers disposed within the reaction vessel and positioned within the raw biomass to increase exposure of the preheated biomass to steam;

pressurizing the raw biomass in the reaction vessel; and rapidly depressurizing the reaction vessel to disrupt a structure of the biomass.

Of course, the skilled person can combine the different features of aspects 1 to 71 and such combination of at least two of the aspects 1 to 71 is also disclosed.

The invention claimed is:

1. A method for producing an engineered soil from raw biomass, the method comprising the steps of:

placing the raw biomass into an inner perforated screen of a reaction vessel; wherein the reaction vessel comprises a main body having a wall and the inner perforated screen located within the main body, the inner perforated screen separating the raw biomass from the wall of the main body, and wherein the reaction vessel comprises one or more perforated screen fingers disposed within the reaction vessel and positioned within the raw biomass to increase exposure of the preheated biomass to steam;

pressurizing the raw biomass in the reaction vessel; and rapidly depressurizing the reaction vessel to disrupt a structure of the biomass.

2. The method of claim 1, wherein the step of rapidly depressurizing the reaction vessel comprises rapidly depressurizing the reaction vessel to produce steam containing at least partially fine lignin-enriched particles.

3. The method of claim 2, further comprising the step of releasing the steam from the reaction vessel containing at least partially fine lignin-enriched particles into a cyclone-type gas expansion vessel configured to capture the entrained fine lignin-enriched particles from the steam.

4. The method of claim 3, further comprising the step of routing at least a portion of the steam from the cyclone-type gas expansion vessel to an input hopper to recapture heat from the captured steam to heat and wet the biomass in the input hopper.

5. The method of claim 4, further comprising the step of subjecting the disrupted biomass to a washing step to remove at least one of salts and light volatile organic compounds derived from the disrupted biomass.

6. The method of claim 1, further comprising the step of prewashing the raw biomass in a prewash container to remove contaminants.

7. The method of claim 1, wherein one or more perforated screen fingers are positioned away from a wall of the reaction vessel to maximize exposure of the raw biomass to the steam, and wherein the inner perforated screen separates the raw biomass from the wall of the main body by 1 centimeter to 10 centimeters.

8. The method of claim 1, wherein the one or more perforated screen fingers comprises at least one screen liner.

9. The method of claim 1, wherein the step of rapidly depressurizing the reaction vessel comprises opening of a rapid depressurization valve a first time for about 1 second, waiting a predetermined amount of time, and opening the rapid depressurization valve a second time.

10. The method of claim 1, wherein the step of rapidly depressurizing the reaction vessel comprises opening of a rapid depressurization valve a first time for about 1 second, waiting at least one minute, and opening the rapid depressurization valve a second time for about 1 second.

11. The method of claim 1, further comprising the step of mixing at least one additive into the biomass after it has been rapidly depressurized.

12. The method of claim 11, wherein the at least one additive comprises at least one of lime, calcium carbonate, urea, a microorganism, and potash.

13. A system for producing engineered soil, the system comprising:
a reaction vessel for pressurizing a biomass located therein and rapidly depressurizing the biomass to disrupt a structure of the biomass, wherein the reaction vessel comprises a wall and an inner perforated screen separating the biomass from the wall of the reaction vessel.

14. The system of claim 13, wherein the inner perforated screen further comprises one or more perforated screen fingers positioned within the biomass during pressurization of the biomass to increase exposure of the biomass to steam.

15. The system of claim 14, wherein the one or more perforated screen fingers are positioned away from the wall defining the reaction vessel.

16. The system of claim 15, wherein the plurality of perforated finger screen liners comprises screen liners having a plurality of screen hole sizes.

17. The system of claim 14, wherein the system further comprises a rapid depressurization valve in communication with the reaction vessel.

18. The system of claim 14, further comprising a prewashing container configured to remove contaminants.

19. The system of claim 14, further comprising a cyclone-type gas expansion vessel configured to capture steam from the reaction vessel and introduce such steam tangentially into the gas expansion vessel, rapidly circulate the steam and separate from the steam one or more entrained fine lignin-enriched particles.

20. The system of claim 14, wherein the reaction vessel comprises at least two steam outlets.

21. The system of claim 20, wherein the reaction vessel further comprises a rapid depressurization valve in connection with at least one of the at least two steam outlets.

22. The system of claim 21, wherein the at least two steam outlets comprise a first steam outlet in connection with the rapid depressurization valve and a second steam outlet in connection with a depressurization valve.

23. The system of claim 22, wherein the rapid depressurization valve is in connection with a first outlet pipe having a diameter of at least 25 centimeters.

24. The system of claim 22, wherein the depressurization valve is in connection with a second outlet pipe having a diameter of at least 4 centimeters.

* * * * *